INVENTOR.
DONALD F. OTHMER

INVENTOR.
DONALD F. OTHMER

United States Patent Office 3,446,712
Patented May 27, 1969

3,446,712
METHOD FOR PRODUCING PURE WATER FROM SEA WATER AND OTHER SOLUTIONS BY FLASH VAPORIZATION AND CONDENSATION
Donald F. Othmer, 333 Jay St., Brooklyn, N.Y. 11201
Continuation-in-part of application Ser. No. 252,473, Jan. 18, 1963. This application May 22, 1967, Ser. No. 639,989
Int. Cl. B01d 3/10, 3/06; C02b 1/06
U.S. Cl. 203—11                                    25 Claims

ABSTRACT OF THE DISCLOSURE

In a multistage flash evaporator wherein flash water is recovered from an aqueous stream elevated to a highest temperature and then flashed in successive stages producing a condensible water vapor at successively decreasing temperature. The aqueous stream is preheated in condensing the water vapor, a minor portion of which preheated aqueous stream is withdrawn and introduced into a flash zone having a temperature lower than the temperature of the zone at which it was withdrawn.

---

This is a continuation in part of my application Ser. No. 252,473, filed Jan. 18, 1963, issued July 4, 1967 as United States Patent No. 3,329,583 having the same title.

This invention relates to a method of multiple flash vaporization of a part of the water in dilute aqueous solution such as, particularly, sea water, waste pulp liquors, sewage and sludges therefrom, while condensing the vapors either (a) to preheat the solution itself by indirect heat transfer, or (b) by direct heat transfer, or (c) to reheat a cycling stream of fresh water by direct heat transfer. In (b) and (c) vapors contact the aqueous streams directly in open flow.

More specifically, the method flash evaporates a part of the aqueous solution in a series of steps which may comprise, besides other steps of the conventional or usual multiflash or the Vapor Reheat multiflash evaporation:

(a) Heating the dilute solution under pressure at least equal to its saturation pressure in a prime heater while there also is allowed sufficient time to conduct a chemical reaction, for example: (i) a submerged combustion conducted by introducing and burning a gaseous or liquid fuel and air or oxygen, (ii) an aqueous phase combustion conducted by introducing air or oxygen to combine with or oxidize organic materials in the dilute solution itself, (iii) a precipitation at the high temperature of salts because of normal insolubility, or because they by themselves change to less soluble forms at the high temperature, or because they combine with other constituents of the dilute solution or of other added chemical materials.

Flash Evaporation of the liquid discharged from the prime heater-reactor in several stages at lower pressures to give steam which is passed to condensing zones which are in the successive stages to condense either directly in the dilute liquid while in open flow, or while flowing counter-currently through the condensing zones, or in a recycle stream of fresh water;

(b) Evaporating a small amount of the dilute solution in the prime heater; the steam formed is passed to what is called a "half-stage" to heat the feed stream of dilute solution of the usual multiflash system or the cycling fresh water stream of the Vapor Reheat system to a higher temperature than any of the flash evaporations;

(c) By-passing of the prime heater by a small part of the dilute solution feed as a stream which is added to the flash evaporation stage next lower in temperature to that of the stream—usually from the second to the tenth down from the highest temperature stage, to recover most of the heat otherwise rejected and lost while operating at less than optimum control of the process variables;

(d) If in a Conventional Multiflash Evaporator, diverting a part of the dilute solution after it has been heated in more than two to ten of the condensing zones of the series of stages and passing it to the flash evaporation stage next lower in temperature—usually from the second to the tenth lower down in the temperature and pressure scale, to recover much of the heat otherwise rejected and lost while operating at less than optimum control of the process variables;

(e) In the Vapor Reheat Evaporator, diverting a part of the recycle stream of fresh water after it has been heated in more than two to ten of the condensing zones of the series of stages and passing it to a condensing zone of a stage from the second to the tenth lower in the temperature and pressure scale, to recover much of the heat otherwise rejected and lost while operating at less than optimum control of the process variables;

(f) If in a Vapor Reheat system, cooling the heated stream of fresh water condensate while preheating the dilute solution before entering the prime heater by a direct contact liquid-liquid-liquid heat exchanger, or by a heat exchanger which uses multiple flash evaporation for cooling;

(g) If in a Vapor Reheat Evaporator, withdrawing steam from one or more stages above the bottom one, possibly also from the prime heater; passing each steam flow to heat, by closed condensation heat transfer, the dilute liquid on a stage of lower temperature; so as to combine Vapor Reheat and multiple-effect in a Hybrid evaporation process.

Water is the usual solvent in dilute solutions or suspensions of fine solids which is to be purified either by distillation or by chemical action at elevated temperatures or impurities after heating and before cooling by the method herein described. However, other solvents may also be considered and purified in the same manner. Sea water often is used as a type of dilute aqueous solution, but the method is not limited to it or to other saline waters. Wastes such as sewage or flowable sludges coming from sewage treatment, black liquors from pulping wood to make paper, and other wastes from food and other industries may be handled. The production of distilled or twice-distilled water, of water purified by removal of impurities therefrom, of concentrated solutions, of products separated after chemical treatment, of steam for other uses, and of power—all are possible with different embodiments of this method.

Solutions and suspensions in flowable form of inorganic, or of organic materials, or of both, may be processed by methods to be described; particularized for the liquid to be processed, the reasons for processing, and the products desired. Thus, a solution of black waste sulfite liquor from a pulp mill has much different possible products than a saline water, also quite different properties including a much higher elevation of boiling point, always important. The waste sulfite liquor, for example, may give distilled water, doubly-distilled water, concentrated solution, water from which the organics have been wet-combusted to give reusable water with some of the inorganics dissolved therein, also heat and power from the combustion.

Hereinafter, recycling of solutions being evaporated in the flash stages is not considered, although it usually reduces heat requirements of evaporation both by the conventional multiflash system, and by Vapor Reheat. This may be a saving of as much as 25% to 40% if only a few stages are used. The advantages of the present invention improve the operation with or without recycling.

Vapor reheat process—general description

More recently, there has been developed a multiple-stage flash evaporation process wherein there are no metallic heat transfer surfaces used in condensing the vapors formed during the cooling of heated sea water accomplished in the multiple flash vaporizations. These vapors are used, not to preheat directly the stream of solution being handled, as in the usual multiple flash evaporator; but instead, the vaporous heat is used to *reheat* a cycling stream of colder fresh water condensate (sometimes called distillate) by direct contact of the vapors with and condensation of them on the surface of the liquid of the fresh water stream. There is a "ladder" of stages with hot sea water descending one side as it cools by flash vaporization in each stage; and colder pure water condensate is ascending the other side to be heated correspondingly by "flash" or "open" condensation. Vapors pass from hot brine to colder condensate across each stage; thus the metallic heat transfer surface for condensation is eliminated.

Inherently, the Vapor Reheat process is economic of heat, particularly with an optimization of the operating variables, as: (a) number of stages, (b) inlet top temperature of sea water feed, (c) ratio of fresh water to sea water fed to the ladder, and (d) ratio of amount of sea water recycled to the prime heater. Minimum heat requirements may be in the low range of 40 to 100 B.t.u. per pound of fresh water produced by this system, depending on the variables, even without the present improvements which reduce these requirements still lower, as noted hereinafter.

Vapor Reheat has the fundamental thermal advantage. The condensate formed on each stage is added to the cycling fresh water stream at its temperature, thus securing an additional cooling and condensation on each higher temperature stage. All sensible heat so accumulated in this stream is then recovered in the single heat exchanger in preheating the feed sea water.

Vapor Reheat to heat, process, and cool uses the same flash evaporation side of the ladder. Flash vapors pass to condensing zones to preheat counter-currently the feed liquid itself in open, dispersed flow. It is then further heated and/or chemically processed, then cooled in the flash stages.

Figures

Flow sheets shown in figures

Figure 1:
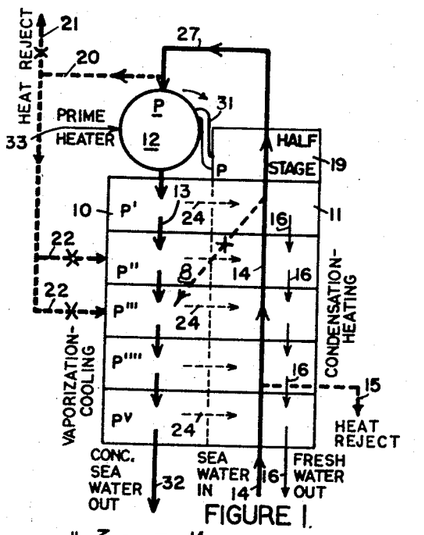
FIGURE 1 is a schematic flow heat sheet of the conventional multiflash evaporator showing how to recover heat which otherwise would be rejected. As in the other figures, only a few stages are indicated. An actual number might be from 5 to 50. Each stage has a Vaporization-Cooling Zone on the left, a Condensation-Heating Zone on the right, with pressures decreasing from P', the high in the top stage, to P'', to P''', to P'''', and down to $P^v$ in the lowest pressure stage.

In FIGURE 1 a dilute solution or flowable suspension, e.g., Raw Sea Water, enters at 14 under a pressure at least as high as its saturation pressure at the maximum temperature encountered. It continues in the closed channel 14 through the condensation-heating zones on the right side 11 of the ladder, while being heated by condensing steam coming in the streams 24 from the left or vaporizing-cooling side 10 of the respective stages. The closed channel for brine being heated 14 passes through a Half-Stage 19, if this is being used. The use and advantages of the Half-Stage 19 in this and other Figures has been explained fully in the parent Application, now U.S. Patent No. 3,329,583. While shown here and in some of the other figures, the half-stage 19 may or may not be used. If not used, it would be entirely neglected; then the hot brine leaves the condensing zone of the top stage to pass through line 27 to enter the prime heater 12. This has an external source of Heat entering by line 33, e.g., steam condensing in a closed coil, not shown. The pressure P is higher than P', and the temperature is at or near the boiling point at pressure P of the dilute liquid.

The brine passes from 12 to evaporating zones in the respective stages at successively lower pressure and temperature in each of the many successive stages, where it flashes to give water vapors flowing in open streams 24 to the cooling zones 11, where the water vapors are condensed on the surfaces of the closed channel 14. The stages are open between their evaporating zones 10 and their condensing zones 11, with provision only that the brine flowing in through lines 13 will not be in contact or mix with the fresh water condensate formed by condensation of the streams of steam 24. The path of the descending brine is indicated by the arrows 13, breaking at each stage, since there is no continuous enclosed conduit, as in the case of 14. The concentrate leaves at line 32. A recycle of part of this concentrate is common, made by a connection, not shown, across from 32 to the sea water inlet of 14.

The line 15 which may be at any stage from the bottom up to 30% of the total number of stages from the bottom, indicates the removal of some of the cold brine feed after some preheating. This removal balances a difference in the capability of: (a) Vaporization-Cooling Side 10 to produce vapors 24 in the multiple flash evaporations; and (b) the Condensation-Heating Side 11, to condense these vapor streams 24 and thus to absorb the corresponding amount of heat. This discharge of brine to outside the system, through 15, removes the heat absorbed by it in the Condensing Zones which it has traversed, without being passed through the system to the Side 10. This indicates a Heat Reject from the system.

There is an alternate method of Heat Reject, which is a feature of this invention. This is the withdrawal of some of the heat of condensation absorbed in the Condensation-Reheating side of the ladder, by supplying less heated brine to the Prime Heater, and hence allowing less heat to be absorbed therein at the same high temperature, through the withdrawal of a stream through the diagonal dashed line 8 which diverts part of the stream in line 14 after it has passed through the condensing zones of a number of the stages, and then introduces it into the flashing liquid stream on a lower stage. Heat also may be rejected by withdrawal of a stream of partly heated sea water through line 20, and by removal from the system by the valved line 21. A more efficient utilization of the heat of this stream withdrawn from 20 is to pass it through the alternate valved lines 22 to some stage below the top, usually from the 2nd to the 10th, or, desirably, where the temperature in the respective stage to which it is passed is at the approximate temperature, or just below the temperature of the liquid being withdrawn in the line 20. This allows the heat otherwise rejected in heated water withdrawn from the system, to be recovered efficiently at whatever temperature level it may be.

The Fresh Water-Out through line 16 is the sum of the condensate formed on the external walls of the channel 14 as it passes through the condensing zones for preheating the brine, while condensing the vapors which have been formed in the vaporizing zones.

Figure 2:
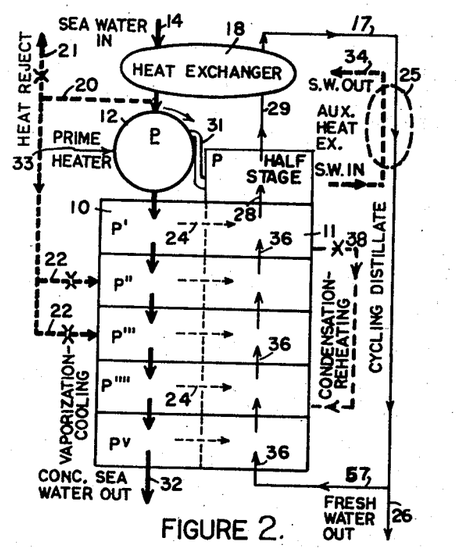
FIGURE 2 is a similar schematic flow sheet of the Vapor Reheat system, also showing how heat otherwise rejected may be recovered.

FIGURE 2 shows a similar operation of the left side 10 of the Multi-Flash ladder of stages, and with flows almost identical with those of FIGURE 1, starting with the preheated brine, in this case coming from the heat exchanger 18. The component parts are similar to those represented in FIGURE 1 and are numbered the same. The Prime Heater 12 again is preheating the feed brine up to substantially its boiling point under the pressure P existing therein. The prime heater 12 also evaporates some of the water from the dilute brine feed to supply vapors through line 31 to the Half-Stage 19, where the vapors at pressure P are condensed to heat the stream of condensate to a higher temperature than in the condensing zone of the last complete stage.

The highest pressure of evaporation, P, is in the prime heater; the brine, after some evaporation therein, passes to stages of successively lower pressures, P', P'', P''', P'''', etc. In each stage there is a flash evaporation of some of the water of the brine entering each stage through the respective lines 13, and finally discharging as a concentrated seat water in line 32. Here again, heat may be rejected as one feature of this invention by withdrawing brine through the line 20 and thence 21, to waste; or more efficiently (and as described later) through the alternate lines 22 into stages of lower pressures, usually 2 to 10 stages, down from the stage of highest pressure, and desirably to enter a stage where the temperature of the brine is just below that of the temperature of the brine leaving the heater exchanger in the line 20.

In FIGURE 2, the resulting steam from the flash vaporizations, passes by the vapor streams 24, in the relatively open stages, to the condensing zones 11, on the right side, where it is condensed by a stream of colder fresh water, 36. This fresh water is former condensate, which is being cycled in open contact with the vapors, thereby causing condensation, since the fresh water is at a temperature below that of the vapor at the given pressure and hence below the boiling point of the fresh water stream at the particular pressure. This stream of fresh water condensate 36 is indicated by broken lines between the stages, since in each condensing zone it is in open flow, just as the brine in lines 13 is in open flow in the evaporating zone of each stage.

The fresh water stream 36 is heated in passing upwardly in counter-flow to that of the flash evaporating stream 13 of brine in the vaporizing zones of the respective stages; also, it is heated in the half stage 19 by the vapors from the prime heater 12 coming by line 31. The combined stream of recycling condensate liquid and fresh condensate formed in this cycle enters the half stage through line 28 and is passed by line 29 to a heat exchanger 18. This temperature in 29 is the highest temperature the fresh water reaches in the system. The heat exchanger 18 may be of any type—shell and tube, liquid-liquid-liquid direct contact, or multiflash condensation; and it reduces the high temperature of the fresh water in line 29 to a lower temperature, only a few degrees higher as it leaves 18 by line 17 from that of the Sea Water-In through line 14.

An auxiliary heat exchanger 25 may be used wherein there is circulated cold raw sea water indicated as S.W.IN and out by line 34, to reduce the temperature of this stream of fresh water, by removal of heat. This corresponds to the additional condensation surface for cold sea water supplied in usual practice in the lower part of channel 14 in FIGURE 1, with corresponding Heat Reject through withdrawal of part of the stream by line 15. The fresh water produced discharges at 26, where a part of the cycle stream of condensate is withdrawn; and the balance is recycled to the condensation zones through 57.

FIGURE 2 indicates still another form of Heat Reject for the Vapor Reheat evaporator. This is by the withdrawal through a line, 38, of a part of the condensate from a stage at least two to ten above the bottom stage and passing this condensate into the right side of the ladder to a stage two to ten lower. This stream flash evaporates there in cooling to the respective temperature and brings about a new heat balance, which by automatic controls may be made to optimize the operation.

In both FIGURES 1 and 2, one embodiment of the invention includes in each case the Half-Stage 19, and the Vapor line 31, supplying vapors to it from the prime heater. As noted above, the Half-Stage may not always be used, and it is then neglected. Vapors to the Half-Stage are formed in the Prime Heater 12 by the evaporation of a part of the water in the dilute sea water.

Figure 3:
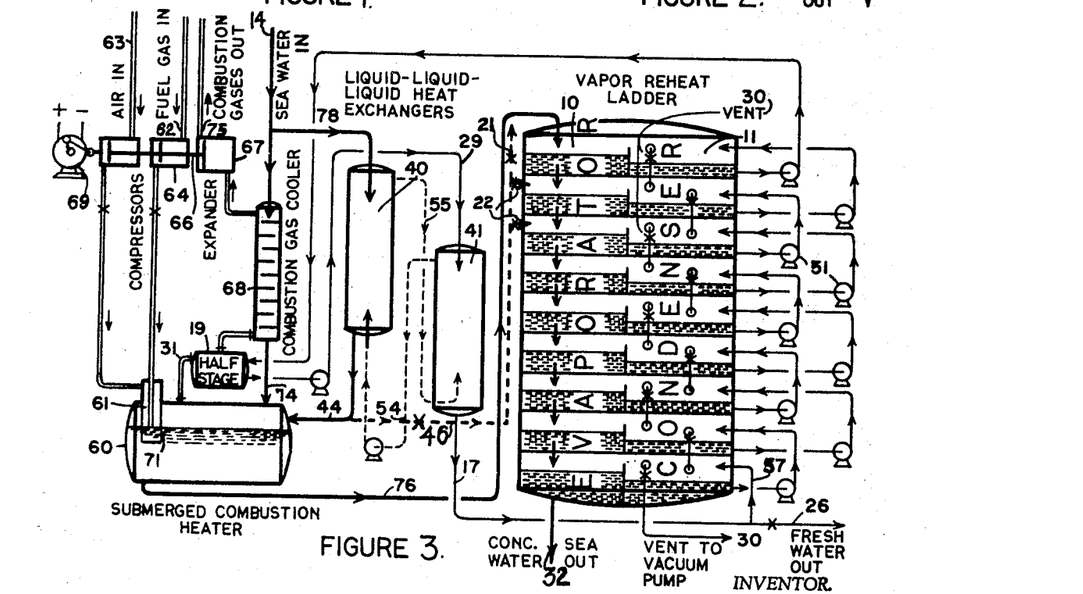
FIGURE 3 is a schematic flow sheet of the Vapor Reheat system showing: heat reject, a half-stage for condensing vapors from the prime heater, submerged combustion of a fluid fuel, and a liquid-liquid-liquid heat exchanger.

FIGURE 3 indicates the Vapor Reheat Ladder, with the same evaporation zone 10 in the left side of each stage and the same condensation zone 11 on the right side of the respective stage. Pumps 51 indicate the method of passage of the water condensate from each stage to the next higher pressure of the next higher stage. Also, a vent to a vacuum pump 30 indicates the removal of non-condensible gases from the condensing side of each stage. The respective vents 30 from each stage may be connected in parallel to the vacuum pump, or they may connect to the stage of next lower pressure, and from thence the noncondensible gases are passed in series to the final vents from the stage of lowest pressure. The pumps 51 and the vents 30 are not shown in FIGURES 1 and 2; and other usual accessories, valves, etc. are not shown in the diagrams.

FIGURE 3 diagrams one means of supplying external heat to the prime heater, of FIGURES 1 and 2; in this case by a submerged combustion heater 60. This is supplied by air line 63, passing to a compressor to a combustion zone 61; also fuel gas enters line 62 being compressed in the compressor 64, and is also supplied to the combustion zone 61 for combustion with the air below the surface of the brine 71, to supply the necessary external heat for the operation of the process. The cold sea water inlet at 14 is partially heated in going through a counter-current contactor 68, the combustion gas cooler. The combustion gases pass through an expansion in the cylinder 67, to be discharged to the line 75. Expansion energy from the combustion gases leaving is obtained in the expansion cylinder by driving a piston therein, connected to pistons on the compressor 64, for the inlet of fuel gas and to compressor 65 for the inlet of air. This, or similar system, allows the recovery of some of the mechanical energy necessary to compress the air and the fuel gas to the pressure of the prime heater. The motor-generator 69 supplies power on start-up, and may deliver electrical power to the buss bars when the operation proceeds at full rate, when such power is available.

The prime heater 60 receives the necessary heat from the combustion of the fuel gas, and heats the sea water supplied by the line 74 coming from the combustion gas cooler 68, to the high temperature of its discharge in line 76, on its way to the successive evaporating zones 10 of the Vapor Reheat ladder.

When there is material present which is combustible in the dilute solution, this may supply the heat after the temperature is raised sufficiently high by external heat as steam or the supply and burning of fluid fuel through 62 and oxygen or air through 63. Then the supply of oxygen or air is adjusted to allow the reaction to proceed without further external fuel. Usually considerable heat may be available, and the combustion gases and steam may be passed directly to the expander 67 to obtain useful power from 69, now an electrical generator.

The half-stage 19, comparable to that of FIGURE 2, serves to pass the heat from the prime heater, received as water vapors and combustion gases through line 31, by direct condensation on the stream of fresh water condensate supplied in open flow through line 28, thereby heating it to a higher temperature as it leaves in line 29.

The liquid-liquid-liquid heat exchanger has a cycling stream of a water-insoluble liquid, in this case with a lower density than that of water, which is cycling through the pipeline 54, to contact directly and countercurrently a descending stream of cold sea water entering from line 78 into the vessel 40. (This stream 78 is the larger part of the sea water or other liquid feed of line 14, the smaller part having passed to 68, the combustion gas cooler.) Thereby, the heated stream of water-insoluble liquid is being cooled in 40, and discharges through line 55 to pass to the bottom of vessel 41. In the vessel 41, the cooled water-insoluble liquid rises through the hot cycling stream of fresh water condensate entering by line 29, thereby cooling this fresh water stream leaving by 17. Line 17 discharges, in part, to line 26 as Fresh-Water-Out, a major part of this stream is recycled through line 27, back to the condensing zone of the stage of lower pressure in the vapor reheat ladder. Meanwhile, the water-insoluble liquid of line 55 absorbs the heat from the hot condensate stream in 29, while directly contacting it in vessel 41 of the heat exchanger; and the water-insoluble stream leaves by line 54 to continue its cycle.

The hot stream of condensate, heated to its highest temperature in the Half-Stage 19, thus gives up most of its added heat in the vessel 40 to the sea water entering in 78. This sea water is thus preheated to pass in line 44 to the prime heater 60, where it is heated along with the balance of the sea water coming by way of line 74.

Either a conventional, tubular heat exchanger may be used instead of the liquid-liquid-liquid one, or in some cases a multiflash evaporator condenser using the feed liquor as coolant in tubes is preferable, as it gives double-distilled water.

Heat Reject may be accomplished by withdrawing preheated sea water from a point between the heat exchanger 40 and the prime heater 60 in the line 44 to the line 20, thence to the valved line 21 and to outside the system. Alternately this stream may be passed through one of the valved nozzles 22 connecting to an appropriate stage where the temperature is approximately the same—from the second to the tenth stage down from the top.

Figures 4, 6:
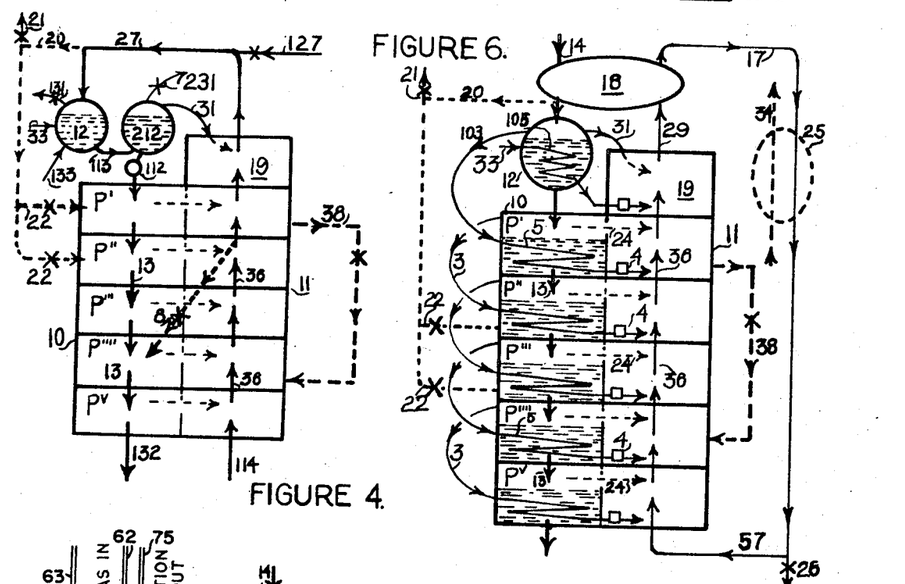
FIGURE 4 is a schematic diagram of a system of multiple flash evaporation of and open condensation of flash-steam in a dilute solution, with a high temperature zone or prime heater between, wherein a chemical reaction takes place. This illustrates Vapor Reheat open condensation on feed solution itself in open-dispersed flow.
FIGURE 6 is a schematic flow sheet of a Hybrid Evaporator. Here is heat reject and a half-stage in a Vapor Reheat Evaporator combined with a built-in multiple effect evaporator having the heat transfer surfaces of its effects adding evaporation on the flash stages.

FIGURE 4 is a flow sheet of another embodiment of the invention wherein the main purpose of the Flash Evaporation and Open Condensation as diagrammed in FIGURE 2 is not for the purpose of concentrating of solution, but rather of heating and cooling it, wherein a chemical reaction or other treatment by or within the solution is desired at a high temperature. There is the typical concentration in the Flash Evaporation, the left side, 10, of the ladder; but the vapors so formed in each respective Flash Evaporation stage are condensed on and in the dilute soltuion feed in open flow in order to heat it. The dilute solution, in open flow, with a large amount of surface open to the vapors from the flash evaporation, passes through the successive condensing zones with the stages, after entering at 14. Open flow is indicated in each condensing zone by the discharge lines, 36, to the stages. The half stage 19, is indicated as another heating zone supplied with vapors from the prime heater 12 through line 31, but the half stage may or may not be used in all cases. Prime heat is supplied through 33 by boiler steam, or, in many cases, by submerged combustion of a fluid fuel supplied from the outside along with oxygen or air. Alternately, if combustible organic materials are in the solution, either in suspended or dissolved, solid or liquid, form, these may be oxidized in a wet combustion by the simple supply of oxygen or air for combustion in the liquid phase.

Oxygen or air may be supplied at a pressure higher than the saturation pressure of water at the temperature in 12, by either line 127 to line 27, or in line 133 to the prime heater 12, which in this case is also a reactor. The line 27 in this figure, as also in FIGURE 1, may feed to the bottom or side of the prime heater 12, which may be a horizontal or vertical cylindrical vessel designed for the operating conditions. In many cases, there may be not only a large amount of heat and then steam formed due to the combustion of either the external fuel supply or the combustibles in the dilute solution. Also, there will be products of combustion and any other gases of chemical reactions which may be removed in the vapor line 131. These vapors and gases, along with steam, at the high pressure of the prime heater, will develop power, as in the expansion cylinder 67 and motor-generator 69 of FIGURE 3, or by a turbine. All or some part may be passed through, or by-passed around the combustion gas cooler 68. Other chemicals may be added through lines 127, 133, or 233—thus an alkali added to 127 will neutralize acetic and other acids while being formed during wet combustion. If added to 233, neutralization is after the reaction. Additional heating may be supplied to line 33.

Steam free of gases is usually desired. The minimum possible amount of steam may exhaust substantially all of the gases in line 131; and the hot liquid passes from the bottom of 12 to a second vessel 212, at a somewhat lower temperature and pressure. Here, it flash evaporates to give almost pure steam in line 231 for external use, while some steam passes through line 31 to the half-stage 19, if used. Substantially 212 and 19 form two halves of a single top stage, with steam being withdrawn from the system; but the design differs from other stages because of additional functions.

One chemical reaction is the precipitation at a high temperature of certain salts, such as those which give boiler scale, as indicated in copending application Ser. No. 644,247, also a continuation of the parent application, Ser. No. 252,473, filed Jan. 18, 1963, now U.S. Patent 3,329,583 and suitable chemicals added through 127 or 133 may aid that process. The essential heating and cooling is done, however, by the present method of vapor reheat with direct condensation of vapors on the dilute liquid in open, dispersed flow.

The reactor is of sufficient size in respect to the amount of liquid flow to allow suitable residence time for the desired chemical reaction—in many cases minutes, in other cases an hour or more.

Solids may form in the reaction, e.g., that of the copending application, Ser. No. 644,247. They may be removed by any suitable filter device indicated as 112. Usually 112 will not be required; and the hot liquid having accomplished its chemical reaction and now being chemically treated in the reactor, passes to the high temperature flashing zone P', P'', P''', P'''', and finally by P$^v$. A larger number of stages than five may often be more desirable.

Here again, for purposes of economizing on heat which otherwise might be rejected, in balancing the heat given in the flash evaporation vapors in the evaporation side 10 and absorbed in the condensation side 11, of the ladder, there may be utilized the method for preventing the loss of heat otherwise rejected. This would be indicated by the line 20, as before, to allow by-passing of liquid around the prime heater, and thence entering at a stage 2 to 10 below the top, or where its temperature may be nearest that of the temperature of the stage it enters. Similarly, the valved line 8, as in FIGURE 1, may allow the withdrawal of a small part of the feed stream after it has passed 2 to 10 condensing stages of the right side 10 of the ladder. This allows another method of recovery of heat otherwise rejected by passing to the flash evaporating zone of a stage 2 to 10 lower, where the temperature is somewhat lower. In this particular utilization of this principle of recovery of heat otherwise rejected by the use of either of the lines 22 or 8, there may be chemical advantages in some cases of the by-passing of a part of the solution around the major part entering the prime heater and the reactor.

As noted above, the heating is being accomplished in the right side of the ladder as the liquid rises from stage to stage while the liquid, after the reaction at the high temperature, is being cooled. Also, additional chemicals may be added to a line such as 111 on the right side, or 110 on the left side, if desired to treat the liquid during the heating-processing, or after the heating-processing, before discharge.

It is obvious that the flow sheet FIGURE 4 might be superimposed directly on the top of the ladder of FIGURE 1, with the elimination of the prime heater of FIGURE 1. Line 27 of FIGURE 1 might enter into line 114 of FIGURE 4; or, saying it another way, line 14 of FIGURE 1 continuing on as line 114 of FIGURE 4, then as lines 36 of FIGURE 4. The outlet 132 of FIGURE 4 would then continue as flash evaporation lines 13 in FIGURE 1. Similarly, FIGURE 4 could be superimposed on FIGURE 2.

One reason for the use of such a system would be that there might be a desire for a chemical treatment, and the heat of reaction of the available combustibles might give more vapors than would be required for the desired amount of production of fresh water. Another reason might be that the upper stages, such as those of FIGURE 4, above either FIGURE 1 or FIGURE 2, would have certain vapors from material formed in the chemical reaction, which would impair the quality of the fresh water which was being produced, if the operation was to be conducted as merely an elongation or increase in the number of stages of either FIGURE 1 or FIGURE 2.

However, a parallel or tandem arrangement may be used instead of a counter-current arrangement of FIGURE 4 being above either FIGURE 1 or FIGURE 2. Such a parallel arrangement is shown in FIGURE 5, wherein the flow sheet of FIGURE 4 of heating-reaction-cooling is indicated as operating with a part of the hot liquid from the prime heater or reactor, while another parallel flow of part of the hot liquid goes to a vapor reheat ladder.

Figure 5:
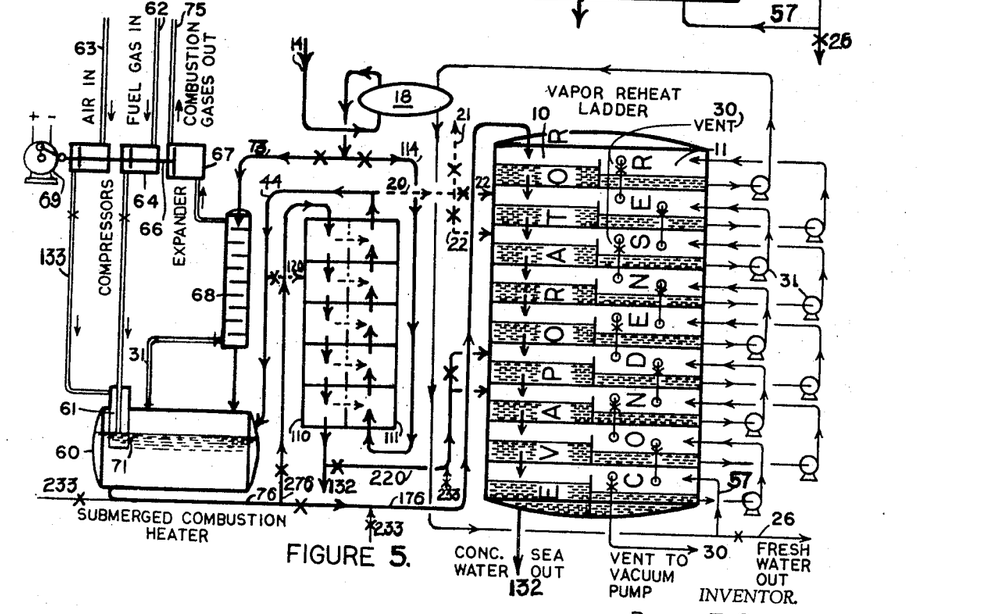
FIGURE 5 is a schematic diagram of a series of flash evaporation stages with open condensation zones and a prime heater as a chemical reactor between the heating and cooling, coupled with a Vapor Reheat evaporator.

FIGURE 5 is thus a combination of the flow sheets of FIGURES 2 and 4 with two uses of the open flash evaporation-open condensation system. The prime heater is also a reactor, similar to the description of FIGURE 4. Its discharged hot solution is divided: partly in series with a vapor reheat evaporator for production of fresh water.

In this case, the dilute solution comes in at 14, passes through a counter-current heat exchanger 18. A by-pass may be made, 73, of some part of the dilute feed, either before or after the heat exchanger, to be used as cooling fluid for the combustion gas cooler, 68. This may or may not be desired, because if the combustion gases together with steam are to be used in a prime mover, the removal of the steam by condensation may not be advantageous.

The dilute solution after passing the heat exchanger 18 of the vapor reheat ladder passes line 114 and enters the right side 111 of the direct heat ladder. It passes up in open flow through the condensing zones of the stages heated by steam from the left side 110, the evaporating side of the stages, and discharges through line 44 to the prime heater 60. A by-pass line 20 may take part of this stream for recovering heat otherwise rejected to the vapor reheat evaporator to the stages through valved inlets 22, or to discharge in 21. A similar valved line 120 may allow feed into the left side 110, to allow a by-pass around the prime heater for saving of heat otherwise rejected into the left side of this flash evaporator-heater. The discharge from the prime heater-reactor 60, after suitable time of retention for the chemical reaction, passes through line 76 with by-pass arrangements so that a part may pass through line 176 into the vapor reheat ladder or through line 276 into the top flash chamber of left side 110 of the flash evaporator-heater.

Discharge from the flash evaporator-heater through valved line 132 may discharge from this system, or through the valved line 220 into the vapor reheat ladder at a temperature near to the temperature in the stream on the left side 10 of this ladder, which will be considerably lower than the temperature of the stream in 176 entering the top.

FIGURE 5 does not show the half-stage on top of the right side 111 of the flash evaporator-heater, nor does it show inlets for chemicals nor provision for filtering at any one of the several points where such may be desirable. Particularly, it may be desirable to add chemicals, by inlets, 233 in line 76, line 176, or line 220. Addition of alkali such as sodium hydroxide or other suitable alkaline material will unite with any volatile acids if such are formed as in the handling of sewage by wet combustion in the prime heater-reactor 60. Such volatile acids will evaporate with the vapors from the left side of flashing stages, and condense in the condensing zones to give water with slight acidity. The addition of caustic or other alkali for neutralization removes such volatile acids. Similarly, in those cases where amines or other volatile alkaline compounds are formed, it may be desirable to treat with a small amount of sulfuric or other acid at any one of the lines 233.

FIGURE 6 diagrams a combination of the Vapor Reheat Evaporator with a multieffect evaporator using metallic surfaces to transfer heat for the boiling. In this case, the condensing-heating, or right side, 11, substantially corresponds to that of FIGURE 2 or of FIGURE 3. There is in addition, on some or all of the flash evaporation zones on the left side, 10, a coil or other heat transfer surface, 5, on which there is condensation of steam from previous evaporations as in a usual multiple-effect evaporator. Thus, there is a combination or hybrid evaporation system comprising both types and some other features.

The familiar heat exchanger, 18, is above the vapor reheat ladder, transferring the heat from the fresh water stream leaving the half-stage, 19, to the sea water feed, 14. The prime heater 12 is heated by an external source, here shown to be prime steam supplied through line 33 to closed coil 105. The sea water, heated to its highest temperature, is passed into the first flash evaporator stage having a pressure $P'$, and then successively by lines 13 to the flash evaporation stages of successively lower pressure, finally discharging from the lowest stage $P^v$, through line 32 as the concentrated brine.

Steam from the prime heater passes through line 31 to the half-stage 19, which is desirable but, again, may not be used. This steam is formed by the evaporation of a part of the sea water in the prime heater, as previously described. The condensate from the coil 105 in the prime heater is passed by the steam trap and line 104 to the half-stage 19, where it gives up its available heat in flashing to the temperature of the half-stage. (Alternately, the steam trap 104 may pass its condensate back to the boilers, as is usual practice with condensate from the prime steam supplied to evaporators.) An additional amount of vapors is withdrawn from the top of the prime heater, through the curved vapor line 103, and passed to a heat transfer evaporator surface in the top or other flash evaporation zone. This surface is indicated as a submerged steam coil 5, but any other type of heat transfer evaporating surface which is suitable may be used. The vapors are condensed and the condensate discharges through the steam trap line 4.

The condensate from the evaporator heat transfer surface, here diagrammed as a steam coil 5, is somewhat warmer than the liquid on the condensing stage on which is operates; and some flash evaporation takes place as this fresh water discharges from 4 to the lower temperature of the condensate on this stage. The heat of the vapors formed is recovered in the system, Alternately, if desired, condensate from 4 may discharge outside of the system.

Flash evaporation takes place as usual, from the hot sea water entering the top stage with presssure $P'$.

The combined vapors from the flash evaporation, plus those formed by the evaporation due to the closed condensation of vapors and heat transfer through the coil 5, are combined and pass as shown by the arrow 24, from the flash evaporating zone into the condensing zone of the stage.

The sea water from each stage goes by the discharge line 13 to the next lower pressure stage for subsequent flash evaporations at the lower pressures P″, P‴, etc. There is also withdrawn from each stage by the curved vapor line 3, fresh water vapors which are condensed in the heating coil 5 of the successively lower stage. In every case, there is a mixture of vapors from: (a) the flash evaporation of the sea water coming from the next higher stage inlets 13, and (b) the evaporation as in the ordinary evaporator by heat transfer in condensing steam in the coils 5. Condensate from the coils 5 in each case, goes through the trap lines 4, to discharge into the adjacent, condensing zone of the respective stage. Combined vapors from flash evaporation and from heat transfer surface evaporation, pass partly as shown by arrows through 24 into the condensation zone, and partly through the curved vapor lines 3 to the coil in the next lower flash evaporation zone.

Fresh water is produced, recycled and withdrawn as usual on the right side 11 of the ladder of stages in the Vapor Reheat evaporator—and in this case, *effects* of the usual multieffect evaporator. In this Hybrid Evaporator, of the two types, the fresh water is the sum of the condensate in the condensation-reheating cycle, and the total of that trapped from the several heat transfer steam coils through the trap lines 4.

With this Hybrid evaporator, it may be desirable to operate without a recycle of any part of the concentrated brine discharging from line 32 back to the inlet of sea water 14 to the heat exchanger, and to accomplish the desired concentration of the sea water before discharge in a single pass. The condensate from the trap lines 4 is in each case used at the next higher stage to condense vapors at a higher temperature, and then finally this heat is given up to heat the incoming liquid. This is a thermally efficient process. Also, all of the heat exchangers are combined in a single one, 18.

*Multiple flash evaporation ladder with half-stage*

FIGURE 1 diagrams the usual multiflash evaporation process on which has been superimposed what has been called the "Half-Stage," an essential feature of the present invention. Its function in production of an additional amount of distilled water without additional heat cost is described below.

The incoming sea water, under a pressure at least as high as the saturation pressure corresponding to the maximum temperature it encounters, passes through the heat transfer tubes, up the ladder of stages, to be heated by the vapors formed by the successive flash evaporations in the left or Evaporating-Cooling sides of the respective stages.

The Prime Heater, in this use of the Half-Stage, is operated not only as a heater, but also as an ordinary evaporator. It supplies vapors at a higher temperature that that of the vapors from the top stage—which come from cooling the liquid leaving the Prime Heater. The vapors from the Prime Heater heat the condensate from the temperature leaving the top stage to within a reasonable approach temperature of the vapors themselves. This is done with a condenser Half-Stage, exactly like the condenser side of any of the stages of flash evaporation. It is superimposed on the ladder, as shown, and supplied wtih vapors from the evaporation in the Prime Heater of a small part of the hot sea water. In a usual multiflash evaporator, the condensation is on a heat transfer surface; in the Vapor Reheat system, it would be by direct condensation on the cycling distillate.

The Half-Stage is supplied with vapors from a regular boiling evaporation. These vapors (neglecting boiling point elevation), are at the highest temperature of the liquid, which is not being cooled by their formation; and they can bring the temperature of the sea water feed up to the temperature of approach to these vapors. Contrariwise, a flash evaporation cools the liquid stream, thus gives vapors coming at a lower temperature than the highest liquid temperature (again neglecting boiling point elevation). Thus, the highest these vapors can heat the liquid, after considering the temperature of approach, is to some temperature between its temperature entering the condenser of the stage and the temperature of he heated and flashing liquid entering the stage. Herein, there is a difference of the Half-Stage from the vaporization side of the full stage. A corollary is that the liquid being evaporated in the Prime Heater is, of course, not losing temperature, as is that in the flash vaporization of the usual stage, since heat comes from a prime source, not from cooling.

Comparing Multiflash Evaporation with and without the Half-Stage, it is apparent that the requirements of heat supplied to the Prime Heater will be the same for each system, since, in each case, it is the amount of heat required to heat the sea water from the temperature leaving the condenser side of the top stage to the temperature entering the flash part of the top stage. But in FIGURE 1, describing one aspect of the present invention, the vapors formed in evaporating the sea water are condensed to give pure water; and this additional amount of product—pure water—is the advantage gained. Also, since this is at the highest temperature level, the flashing of this additional amount of pure water produces an increment of vapors and condensate in each stage down to the lowest, or a total advantage of increased product, considerably more than the condensate in the Half-Stage.

Exactly the same reasoning may be applied for the use of the Half-Stage superimposed on the Vapor-Reheat ladder, as in FIGURE 2. Here again, the amount of vapors condensed in this Half-Stage represents a net gain of pure water product to the system without any increase in the requirement of prime heat, i.e., that supplied from the outside. However, in FIGURE 2 there is the reasonable assumption that the Heat Exchanger will absorb the available heat in the hot distillate at its temperature and pass it to the entering sea water to bring that within the same temperature of approach of the hot distillate as without the Half-Stage.

In the Vapor-Reheat system, the use of the Half-Stage increases the product and reduces the unit heat consumption by from 5% to 20%; and in the usual multiflash system, the advantage is 10 to 25%. The greatest improvements are always with the lesser number of stages.

Likewise, in the use of the flash evaporation-open condensation ladder with a chemical reaction at the highest temperature, the Half-Stage may be used as in FIGURE 4, to advantage, even though the production of fresh water is not an object because the temperature of the liquid feed to the reactor may be brought to a higher temperature by the Half-Stage, in those cases where there is an excess of heat produced by a wet combustion or other chemical reaction.

Also, in the Hybrid Evaporator, the half-stage has a particular advantage in that it may well operate in parallel with the first (top temperature) effect of the multiple-effect, and serve to receive efficiently the condensate of the trap 104.

In neither of these nor the other figures, however, is it obligatory to use the half-stage in order to obtain the advantages of the other features of this invention.

*Recovery of heat otherwise rejected*

In the operation of a usual multiflash evaporation system, the raw sea water stream is heated by the condensation of the vapors formed in the successive vaporizing-cooling compartments of the stages by the flashing of the sea water after it is sufficiently heated. The preheated sea water then passes through a Prime Heater which supplies heat to raise the temperature to the higher temperature necessary for the top stage flasher.

For a given system there would always be specified the number of stages and the top temperature—the highest available under the specifications available, also the lowest temperature—that of the sea water available. For heat economy, it is desirable to recover as much heat as possible from the discharge of concentrated sea water, i.e., to reduce its temperature as low as possible; and furthermore, to choose a recycle ratio of discharge sea water fed back into original sea water feed so as to give optimum operation and minimum heat cost. (Such a recycle is not shown on the flow sheets of the figures, but is commonly used.) All of the possible variables may not be independently specified, and still have an operable and balanced system.

Under some conditions of operation, it has been found that there may be a larger amount of sea water required to be passed through the condensation side of the ladder in order to condense the vapors, than can be utilized in the vaporization side. Thus, in FIGURE 1, line 15 discharges a Heat Reject stream of sea water which has been heated in only a few of the stages of lowest temperature. Another way of noting the same effect is that there may be a lesser amount of heat present in the hot sea water leaving the top stage than will be supplied as vapors by this same quantity of sea water when it passes to the Prime Heater and the top stage of the Vapor Reheat ladder. This may be due to an imbalance of control of the several operating variables of a system of a given number of stages, i.e., the amount of sea water fed in at its given temperature, the amount of sea water recycled, if any, and the temperature of discharging the sea water from the Prime Heater. Only one value of each variable will give a balanced system.

In some cases, it is impossible to balance all of these operating variables under the most advantageous conditions of operation; however, it is always necessary to condense the fresh water vapors being formed and to add this heat to the inlet sea water stream. This may be done by increasing the feed of sea water to the system. If the excess heat develops, it becomes necessary to discharge some heat from the system through a discharge of some of the preheated sea water passing through the Condensation-Heating Side and before it passes to the Prime Heater and the top flash evaporation compartment. It has therefore been common practice to discharge a small amount of the heated sea water leaving the top stage Condenser-Heater before it goes to the Prime Heater. However, this prevents the unit being operated at its full duty, in which case the sea water recycled would be at a higher than desired temperature when reentering the bottom stage along with original sea water.

This heat rejection hitherto found necessary represents a loss from the system which it has now been found possible to recover; at least in large part.

FIGURE 1 shows, by a dotted line 20 by-passing the Prime Heater, a stream of sea water from the top of the Condensation-Heating side discharging through an exhaust valved line 21 entitled "Heat Reject." This allows an outflow of as much heated sea water as may be required to maintain a balance, from 2 to 5% would be usual, although in the case of an upset in operation, this might go up to 10% or even higher temporarily. The other branches 22 and 23 of this dotted connection are the preferable connections of the present invention. The Heat Reject valve 21 is closed; and a small amount of the sea water, preheated from the Condensation-Heating, is passed to by-pass the Prime Heater and the top of the ladder of stages. In this case, the stream is indicated as entering the Vaporization-Cooling side of the ladder at the second, or alternately the third chamber from the top. FIGURE 1 is merely diagrammatic; and depending on the temperatures involved and the total number of flashers in the system, this inlet might desirably be made between the second to the tenth flasher from the top. (Also, FIGURE 1 shows the alternate Heat Reject stream, larger in amount, often taken for the same reason from the sea water feed at a low number stage.)

By allowing a part of the sea water which has been preheated in the Condensing-Heating side of the ladder of stages to pass through this by-pass indicated by the dotted circuit in FIGURE 1, through line 20 and either one of valved lines 22, the heat therein is obtained for further use at the highest temperature level for which it is available. Thus, the flash chamber to which it is added is that having the temperature next lower than the temperature of the sea water at that point. By having a header with valves to several possible connections (only two of which are shown in FIGURE 1) the proper stage can be selected for inlet of a part of the liquid.

The fraction of the amount of sea water discharging may be desirably from 5 to 20% of the sea water entering, although usually it will not exceed 10%. This amount of the preheated stream of sea water is withdrawn, by-passing the Prime Heater and the top stage of the ladder of stages, and thence passed into the selected stage. The flashing takes place of this liquid along with the balance of the sea water from this stage successively downwardly on to the lowest stage wherein there is a withdrawal of the concentrated sea water. By proper control of the valve determining the amount of withdrawal of the by-passed stream, the system may be brought into a steady state, utilizing the heat supply to the maximum effectiveness. (Also, it has been found that the heat reject, by additional cooling in the lower stages, is made equally unnecessary for the new invention, which thus uses heat more effectively and has lower unit consumption than do standard systems.)

At first, the adjustment of the system through by-passing a stream of excess preheated sea water around the prime heater to the flashing compartment of a stage near the top will cause an additional amount of vaporous heat to be removed in the condenser-heater section on the right side; and another adjustment of the valve controlling this by-passed stream will have to be made to accommodate this. Subsequent minor adjustment enables the operation to come to the desired steady state.

The control of the amount of the by-passed sea water stream may be made partially or completely automatic by a combination of suitable thermostat valves, one controlling the discharge of the sea water before entering the prime heater, and others at the several inlet points to the ladder of stages. Manual selection is simple when the ladder of stages has a thermometer indicating the temperature of each stage, and the liquid by-passing the prime heater goes to the stage having the next lowest temperature. However, control of the amount of liquid flowing in this by-pass may well be done automatically. Thus, there may be selected automatically from its temperature, the proper entrance point of the stream by-passed around the prime heater and the top stage or stages. (Meanwhile, the temperature of the liquid leaving the prime heater is kept constant, while its amount fluctuates, since the by-passed liquid does not pass through the prime heaater.)

In usual practice, the multiflash units for desalination of sea water reject heat from the flash evaporation side to balance that which can be absorbed by the condensing side, in another way with, however, consequent loss of heat. Thus, a part of the entering sea water, after passing through the lowest temperature stages (lower right corner of FIGURE 1) may be discharged to waste through line 15 without climbing more than 10 or 15% of the total number of stages in the ladder. A larger amount of sea water thus enters than is heated to the high temperature; and it only serves to condense the vapors from the lowest stages, as indicated by the stream shown by the dotted line, 15, Heat Reject.

Similarly, in the use of multiple flash evaporation for concentration of brines, where the lowest stage is at atmospheric pressure, there often occurs an excess steam over that which can be utilized in preheating the feed.

This steam, with its heat to be rejected, is allowed to vent to waste. In both cases, heat is lost, while in the present Recovery of Heat Otherwise Rejected, the full amount of heat in the brine before the prime heater is utilized at the highest temperature at which it is available, and practically no heat is wasted, even if the control of the ratio of recycle brine is relatively badly in error.

The desired removal of the heat from the Condensation-Heating side at the top of the ladder of the usual Multi-Flash Evaporation by taking the out-stream through line 20, may be most convenient, and even most efficient in its utilization. However, it is also possible to obtain some of the advantages of this Recovery of Heat Otherwise Rejected if a stream of the sea water being heated is taken as it passed through or from one of the upper stages of the Condensing-Heating side after it has gone through the condensing zones of the flash stages of lower temperatures. This stream then may be passed to a lower stage, desirably, but not necessarily, at a temperature near that of the separated stream itself. The separated stream may be from 5% to 20% of the total feed of sea water. This is shown by the diagonal dashed line 8 in FIGURE 1 which removes an amount controlled by the valve of the partially preheated sea water and passes it to another and lower stage, where it is allowed to join and be partially flash evaporated with the heated sea water. FIGURE 1 is diagrammatic and does not indicate that the line 8 is necessarily internal in the evaporator body itself. It may be outside.

The valved line controls the amount of sea water diverted and thus the amount of heat removal to the lower stage. This Heat Reject in the heated sea water is withdrawn in the condensing zone, but much of it is actually recovered. This lower stage to which it is returned may be from two to ten stages below the point of withdrawal. Hence, the point of withdrawal must be at least two to ten stages above the lowest temperature stage, and preferably it may be considerably above. In fact, it has been found that usually the higher the point of temperature of this withdrawal of this stream in the series of stages, the more efficient will be the recovery of heat otherwise rejected.

In the operation of the Vapor-Reheat system, there is similarly the difficulty of independently setting and controlling the several operating variables of the system. Thus, it is usually desirable to maintain the highest operating temperature for the brine entering the top flasher container, under whatever limitations there may be for this; also it is desirable to maintain the minimum possible temperature of the fresh water recycled to the bottom stage in order to secure the lowest operating temperature there for optimum amount of condensation. Furthermore, the ratio of recycle of distillate and of recycle of brine to brine fed are most important factors which may be independently controlled. (Normally, the temperature of approach in the heat exchanger may be assumed to be fixed if the heat exchanger is of adequate capacity for the system.) These four functions, (a) temperature of the brine inlet in the top flasher, (b) temperature of fresh water inlet to the bottom chamber, (c) amount of recycle of disillate, and (d) amount of recycle of brine (not shown on flow sheets) cannot be fixed independently. Here again, as with the usual multiflash system, it has been found desirable to utilize a similar system of balancing of variations of capacities for evaporation and condensation on the two sides of the system, without rejecting heat.

FIGURE 2 shows a diagram of the connection similar to that of FIGURE 1, which is made to take care of an imbalance of heat flows in the two sides of the Vapor-Reheat ladder. (These may be noticeable with variation of either of the two recycle ratios.) Here a larger amount of cooled distillate may be circulated to condense the vapors formed in the vaporization compartment of the stages. Since this may not be practical, as an immediate adjustment less sea water must be vaporized than is required in the heat exchanger to remove the heat from the fresh water from the top stage. Here, again, normal practice would be to discharge some of the prheated sea water just before it enters the prime heater, and a dotted valved connection for such heat reject is indicated by the line 20 and the valved exhaust 21.

Again, however, by by-passing around the prime heater and the top stage or several stages, as shown by line 20 and alternate valved inlets 22, a fraction of the stream of preheated sea water (at most 10% to 20%, and usually not more than 2 to 8%), the preferred method of removing this heat has been found which secures smooth control and utilizes all available heat most advantageously at the highest possible temperature, by-passing the fractional stream to that stage where the temperature is just lower. The point of most effective entrance to the ladder of this stream by-passed from the main stream of sea water preheated in the heat exchanger has been found to be from the second to the tenth flasher from the top, depending on the temperature range of the operation and the number of stages.

Alternately, there may be a low temperature or auxiliary heat exchanger 25 which chills the recycle stream of fresh water by another stream of sea water which is discharged to waste through line 34 with no attempt to recover the heat added thereto. This is shown by the dotted lines in the upper right of FIGURE 2, and it will cool the cyclic stream of fresh water to a temperature approach that of the raw sea water. This represents a heat loss near the lowest temperature reached in the system, but the loss in heat is important in increasing the heat requirements per unit of product.

A similar arrangement with an auxiliary heat exchanger could be used in the case of the standard multiflash unit of FIGURE 1, but this is not shown. A part of the concentrated sea water is usually recycled to the sea water inlet, as above mentioned. This case also represents an auxiliary heat exchanger. It may be used alternately to the by-pass of the stream around the prime heater as described above; but it wastes heat. There is indicated, however, in FIGURE 1, by the heavy dashed line 15 at the lower right, the common means of Heat Reject (and waste) for the multiflash system, wherein a part of the sea water feed is discharged after the lowest several stages.

This use of excess heat in the sea water required for the right or condensation-heating side of the ladder, which otherwise would have to be rejected and wasted, by the passage of a stream to a flash vaporization compartment somewhat below the top may be equally effective with each of these different modifications. In practice, it allows the full use of the heat available by feeding it back to the system at the highest temperature at which it is available, and then compounding its effectiveness down to the lowest temperature at which it is usable.

Thus, as an example, exhaustive studies have shown that in the use of the Vapor-Reheat system with ten stages, an inlet stream of sea water from the prime heater to the top stage, at 300° F., an inlet of chilled fresh water distillate to the bottom stage a 60° F., and a sea water temperature of 55° F., a change of only 10% in either direction from the optimum ratio of distillate recycled to sea water feed gave an increase in heat consumption per gallon of product water of almost 50%. (This indicates the care necessary and the instrumentation required in operating such a system.) This increase in heat requirements represents the amount of heat which might be rejected in such an exceptional use. However, by diverting the flow to the next to the top stage the increase in heat requirements (heat lost) over the minimum possible recycle ratio was only 5%. Such operations may be controlled quite automatically with simple thermostats and flow controllers.

When optimum values can be established for the variables, and then maintained by exact control, this heat loss will disappear. In practice, the average usual loss is from 10% to 20% of the theoretical minimum; and by control in the manner indicated, it may be reduced to 2% to 3%.

In the Conventional Multi-flash Evaporator, a similar reduction in the amount of heat otherwise rejected may be secured by the diverting of a portion of the stream of preheated sea water around the Prime Heater. In this case, there may be, instead, a diversion of a portion of the partially preheated sea water, after it has passed through a substantial fraction of the total number of condensing zones of the stages. This diverted portion then may be passed to the flashing zone of a stage, two to ten below in the number of the stage in order of temperature and pressure; and the increase in efficiency of the system, i.e., its heat requirements per unit of water evaporated will be almost as good.

In a *Hybrid Evaporator,* either of the Multiple Effect with a conventional Multiflash or with a Vapor Reheat, the advantages pertain as indicated above. However, since the control is more complex with the Hybrid, the advantage to the operation of a rapid method of balancing the system, e.g., after an upset in operation, is correspondingly greater. The heats of evaporation, both flash and via a metal surface, and of condensation, must continually be equated; and in fact, this system of Heat Reject and its substantial recovery aids in the balance of the multiple effect aspect, as well as of the multi-stage aspect, insofar as they are separately distinguishable in this interlocked system.

In the flash evaporation cooling of a liquid after it or its impurities have been involved at a high temperature in a chemical reaction for their elimination, the system for recovery of heat otherwise rejected is of major help, not only in recovery of heat as normally; but also in controlling the reaction. Thus, if due to an upset caused by an unusual amount of combustible material in the feed, the reactor tends to overheat, it may be controlled without the upset spreading rapidly to the balance of the system merely by the automatic by-passing of liquid around the Prime Heater-Reactor. Most of the sensible heat is thus recovered.

*Liquid-liquid-liquid heat exchanger—as used in vapor reheat method*

Another method of heat exchange, as shown in FIGURE 3, with vessels 40 and 41 interconnecting circuits 54 and 55, also by direct contacting of fluids, has been the heating of one process aqueous stream by the cooling of another aqueous stream, through the use of an intermediate water-insoluble liquid as a heat carrier. Previously, there has been used as the heat carrier a petroleum fraction: gasoline, naphtha, or heavier oil, depending on the temperatures of the liquids involved. The oil (as it will be called) circulated in line 55 is heated in vessel or tower 41 by being intimately and counter-currently contacted with the hot, aqueous stream circulating in line 29, which is thereby cooled. Then the heated oil leaving 41 by line 54 is cooled by being intimately and counter-currently contacted in vessel or tower 40 with the cold, aqueous stream which is thereby being heated; and the oil recycles time and again through the circuit 55–41–54–40–55, etc., as a carrier of heat from the hot aqueous stream and to the cold aqueous stream. Almost complete mutual immiscibility of the oil stream with the aqueous streams and with any salts dissolved in one of them prevents contamination of one aqueous stream by the other through interchange through the oil. Also, there is possible a complete separation of each liquid phase. Paraffin hydrocarbon fractions of high purity and with a boiling point above the operating temperatures, have usually been used.

Usually the two halves of the operation are conducted in separate vessels: in some cases both steps are combined in one tower, with the oil entering the bottom and contacting the two aqueous streams in sequence as it rises to the top. This is diagrammed in U.S. Patent 3,250,081.

FIGURE 3 diagrams one form of the liquid-liquid-liquid heat exchanger which may be used. It is made up of two vessels or towers 40 and 41 of the same type of equipment as liquid-liquid extractors of the "open tube" or "droplet" type. It may also be made up of other more complicated and expensive types of counter-current liquid-liquid contactors, e.g., that described in Othmer, U.S. Patent 2,000,606, and modifications thereof, the R.D.C. type, the York-Scheibel type, etc., also any other type of tower with packing or other internals suitable for liquid extraction.

*Flash chilling of hot condensate stream—As used in Vapor Reheat method*

The hot condensate stream leaving the top stage at pressure P′ on the right side 11 of the Vapor Reheat ladder of FIGURE 2, either with or without the Half-Stage may be passed to a vessel at a lower pressure to allow a partial flash evaporation. Vapors so formed may be condensed, suitably on tubes carrying the inlet sea water, to give a condensate which is then twice-distilled water. This flash evaporation and condensation would take the place of the Heat Exchanger of FIGURES 1, 2 or 3.

In U.S. Patent 3,306,346 of Feb. 28, 1967, entitled Method for Cooling Volatile Liquids, there is described an improvement of this method of heat exchanging using very similar operations to those being discussed. The hot condensate coming from the top stage or the Half-Stage, may be cooled by several or more flash evaporations in a second series of stages. The vapors are passed to the other side of the respective stages of this second series, to be condensed on tubes passing through the stages carrying the inlet feed of sea water (after being suitably de-aerated if desired by standard processes). The feed, in tubes, is thus preheated by vapors condensing on the outside of the tubes, as in the usual multiflash evaporator. Instead, in this case, the vapors are from a stream of hot distilled water being cooled by flash evaporation.

The condensate from this flash heat exchanger, i.e., the second series of stages, is thus "double-distilled" water; and its purity is higher than that from any single evaporation. Water of such high purity may thus be separated as the product. Its amount will approximate the flash evaporation of the sea water itself, in the other series of stages. This condensate of the second series of stages may be allowed to return to the original stream of the hot volatile liquid being cooled in each stage, as discussed in the co-pending application. A part of this stream would then be withdrawn as the product, after cooling as described above for the other cases.

Also, since the temperature range of this second ladder of stages is that of the entire original ladder, except for the top stage, these two ladders may be combined physically into a series of stages having four streams with interconnecting vapor passages: (a) enclosed heating of sea water, (b) open flashing of sea water, (c) open condensation on cycling distillate, and (d) open flashing of cycling distillate.

This preheater for the sea water is designed to insure high velocities in the tubes preheating the sea water and low hold-up time. Thus, a minimum of time and opportunity is given for scale formation and growth on the heating surfaces.

Double-distilled water from a multiflash cooler and closed condensing system is of particular advantage when sewage waste is wet combusted; and the large amount of heat available gives a high temperature of the water leaving the cooling side of the vapor reheat system. If potable fresh water is evaporated from sewage, the highest possible elimination of impurities is desired, if only for aesthetic reasons; and doubly-distilled water is very pure indeed.

Combined flow sheet of vapor reheat process

FIGURE 3 is a diagrammatic flow sheet representation of the process wherein a ladder of nine stages of Vapor-Reheat operation is indicated, each stage being enclosed in a pressure-tight container. Each stage is a two compartment space, interconnected for vapor passage from left to right. This may be embodied in separate vessels with interconnecting piping allowing vapor passage from the flash evaporator to the flash condenser. Alternately, each stage may be a cross-sectional part of a single vessel; and this design has often been used as the construction method—usually horizontally disposed—for the series of stages in a multiple effect flash evaporation unit. The wall dividing such stages is then under only the slight differential pressure existing between the two stages. A cheaper construction is thus obtained since all walls of the stage do not have to be sufficiently strong to withstand the total internal pressure. Also, piping is simplified between stages. Often in the past practice with usual multiflash evaporators, a single horizontal vessel has been used for a multiplicity of stages. However, a vertical vessel with stages built like plates in a distilling tower has been found to have advantages. There is a single baffle to keep the liquid streams apart in the two separate compartments of the pressure-tight container; but free movement of vapors is possible horizontally above the baffle. Such an arrangement is shown in FIGURE 3.

Hot sea water passes downwardly on the left side 10 from the top or highest pressure stage. It flashes on each successively lower pressure stage to give vapors, which pass across each stage of the ladder. These condense to reheat the distillate which is cycled counter-currently. The hot sea water enters the left side of a stage designed to expose a maximum of liquid surface as to contact effectively and to come to equilibrium with the vapors at the prevailing pressure of the stage. The downwardly pointing arrows may indicate sprays of seat water to give large water surfaces for contact with the vapors. The droplets may almost literally explode due to the higher internal vapor pressure when sprayed into the lower pressure for flash vaporization. Alternately, thin layers of liquid on one or more trays, or as descending films, also may be used to increase the surface of the flashing liquid. Many arrangements of cascading liquid have been used from trays inside the stage; these give large areas and thus promote ready evaporation and the attainment of equilibrium between the liquid and the vapor phases.

The surface for evaporation does not need to be large compared to the normal heat transfer surface utilizing metallic surfaces. It may be obtained by baffles or horizontal surfaces with overflow films tricking downwardly; and the exact method is not the important part of this invention. One suitable method uses horizontal overflow surfaces; another uses liquid sprays with a relatively low pressure drop obtained with relatively large ports for liquid passage and moderate velocities of liquid. Only a small amount of time is required for a very close approach to equilibrium; hence, a very small hold-up of sea water in the stage is necessary.

Two pressures: (a) the gravity head of each stage superimposed above the next lower one, and (b) the difference of vapor pressure pertaining, cause the flow of seat water downward on the left side through the sprays or other systems which may be used. Float valves (not shown) may be arranged to control the flow and maintain a level of sea water in a shallow body on its part of the tray. Alternately, other forms of trap valves such as any one of many types of standard steam traps may be used to allow outflow of sea water from a stage to be regulated so as not to allow vapors to pass, but to balance the inflow. Among such devices which may be used for this control purpose are the so-called "thermodynamic" traps commercially available. By a "floating" disc or suitably designed labyrinth passage these traps stop vapor passage but allow liquid to flow readily due to the pressure gradient from stage to stage.

In the case of the cold distillate (previously produced pure water) circulated to each stage, progressively higher than the previous one in pressure and often, as in these figures, in elevation also, this also requires liquid-vapor surface. Somewhat more surface has been found to be necessary than in the evaporating surface for the same amount of heat transfer, particularly if there are noncondensible gases which have not been removed. Even more desirable here it is to have a maximum liquid surface in contact with the vapor to permit thermal equilibrium to be obtained by condensation of vapors, and heating of the distillate successively from stage to the next higher stage. Here again, for the purpose of this diagram, overflowing horizontal surfaces may be assumed to give the necessary area for contact of vapors and condensation, although in practice, sprays allowing greater amounts of liquid per unit volume are usually preferred.

Each stage of the ladder is provided with a barrier or baffle system to prevent sea water mixing with fresh water—or vice versa—without interfering with free vapor passage from left to right. Obviously, these two sides of the ladder may be in two separate spaces, or even separate vessels, with vapor piping in between; and this may be desirable in very large units. The effect would be the same, except that the vapor piping is then designed to minimize friction losses, and accompanying pressure losses, with concomittant temperate losses for effecting heat transfer.

Recycle or "reflux" of a part—up to 50% or 60% or even more of the concentrated sea water discharged from the lowest stage back to the sea water inlet, has been found to save the heat in this discharge which is available above the temperature or raw sea water. However, for simplicity in this and other figures, the necessary connection is not shown.

The fresh water distillate is cycled from the lowest pressure stage, the bottom one in FIGURE 3 to the top or high pressure stage and thence through a heat exchanger and back to the lowest pressure stage. On each stage, the level of distillate may be maintained constant by a float valve (not shown) which opens as the liquid rises. The transfer of liquid to the next higher stage may be done by the series of centrifugal or other pumps 51 shown to the right of the Flash Condensers. The volume of the condensation is increased by the condensate in each stage; and a part of the distillate is continuously withdrawn, equal to the increment of one cycle. This is the product, fresh water, for discharge through line 26—out of the system.

In the Vapor Reheat system of multiple stages, the two liquid streams are flowing in counter-current. By arrangement of the stages in a vertical system (and single external shell of vessel preferably) one liquid stream may be allowed to flow downwardly from stage to stage by gravity. If this is the sea water stream, the vapor pressure differential pressure assists the movement. Since a relatively smaller subdivision of fresh water is required for attainment of condensation on the distillate side, the sea water has been allowed usually to flow downwardly from one higher stage to the next lower stage without mechanical assistance by pumps. In normal pressure ranges, and with the large number of stages required, it has been found desirable or necessary to force the recycling distillate upwardly from stage to stage by means of a pump between each stage. This, then, adds four increments of pressure required by:

(a) Elevation and gravity,
(b) Higher vapor pressure,
(c) Mechanical energy required to break up water into other forms with correspondingly great increase of surface, and
(d) Pipe friction.

The sea water, under pressure at least as high as its saturation pressure under the highest temperature encountered, is preheated before entering the top pressure stage. The heat exchanger suggested in U.S. Patent 3,306,346 of Feb. 28, 1967, Method for Cooling Volatile Liquids, has advantages over a usual tubular type. Also may be used a liquid-liquid-liquid combination as diagrammed in FIGURE 3 or in a single shell as mentioned above.

Preheated sea water passes to a prime heater wherein there may be a submerged combustion of fuel gas or liquid, as described below.

Submerged combustion

So-called "submerged combustion" of either gaseous or liquid fuels is yet another type of heat exchange by direct contact of fluid streams, in this case the hot combustion gases and the sea water being heated. By burning a liquid or compressed gaseous fuel with compressed air under a liquid surface, the heat of the combustion is made available directly to the liquid. This has been used to give hot water or hot solution, or to evaporate corrosive or other solutions which are difficult to handle.

FIGURE 3 diagrams a horizontal vessel fitted with an internal combustion chamber 60 supplied with fluid fuel through line 62, and air through line 63 under pressure supplied by compressors 64 and 65, respectively; also with a supply line 73, and discharge line 76 of sea water; also discharge means line 31 for combustion gases with more or less steam.

One accessory of this Submerged Combustion Heater is the Combustion Gas Cooler 68. This allows also the elimination of noncondensible gases from the feed sea water. Such gases will be forced out of the sea water as it is heated in the Submerged Combustion Boiler; and these gases will go off with the combustion gases and be cooled and discharged together through an expander 67 for recovering the energy of compression of the gases; thence from the system through line 75.

A part of the cold sea water fed to the system passes downwardly through the counter-current scrubber or Combustion Gas Cooler 68. This chills the products of combustion from the submerged combustion operation to the lowest possible temperature, in order to condense out the maximum of water vapor before discharge. The lowest available cooling medium is the inlet sea water. The Combustion Gas Cooler is a simple tower with flow of sea water down over packing or cascade trays, against the rising gas stream. Desirably it has a height equivalent to from 4 to 10 equilibrium units in counter-current. A small part of the entering, cold sea water condenses the water vapor associated with the mixture of noncondensible gases of the feed sea water and the combustion gases; principally carbon dioxide and nitrogen, so that they discharge at a temperature preferably not more than 20° F. above the raw sea water temperature, and saturated with moisture under those conditions. These cooled gases, preferably after an expansion in an expander 75 which recovers the energy required for compression of the air and gaseous fuel (if such is used), may then be passed to any external use, if use there be for this gas mixture.

A greater number of moles of carbon dioxide is produced from most gaseous fuels than the number of moles of the fuel; and the nitrogen of the air and any unburned oxygen passes through without change. Hence, there may be recovered most or all of the energy required for compression of fuel gas and air since there is a larger number of moles of gas at the higher pressure to be expanded than the amount of gas at the lower pressure to be compressed (both throughout the same range). This may be done by a system of three cylinders on a common piston rod as indicated in FIGURE 3, with the expansion energy of the Combustion gases in the Expander or right cylinder serving to drive the pistons in the two left cylinders or Compressors for compressing the fuel gas and the air for combustion to the higher pressure required for the combustion under the liquid. Alternately, a turbine may be driven by the expanding combustion gases, this turbine being on the drive shaft for two turbine blowers, one for air, and one for fuel gas. In either case, a motor or other prime mover would be connected to the mechanical system, for start-up, or make-up of energy when required.

When the submerged combustion is of the organic materials present in the dilute solution itself, it is often called a "wet combustion." Such wet combustion will require less, or possibly no, added fuel through the line 62, although air will still be required through line 63. In this case, the balance of energy available from the expansion of the combustion gases will be somewhat greater than that where a gaseous fuel itself must be compressed in compressor 65.

As indicated in FIGURE 3, a motor-generator 69 is connected to a crank arm of the piston-rod for 64, 65, and 67. On start-up, 69 acts as a motor to compress the air and the gaseous fuel. During regular operation, 69 operates as an electrical generator to give what may be a substantial amount of power over that required for the compressors. This may be a net gain for other use or sale.

The carbon dioxide from the combustion may react with calcium or other salts present in the dilute solution, to give relatively insoluble carbonates which may precipitate. If dilute waste pulping liquors are being processed, either for evaporation or for wet combustion, the stable salts under the particular conditions will usually be the carbonates, and the acetates, plus others depending on the cooking chemicals used.

In some cases, organic and oxidizable materials are present in the dilute solution being processed, such as sewage, sludges therefrom, waste liquors from pulp and paper manufacture—rather than the sea water of the usual examples. These waste materials in a macerated or comminuted form may supply ample heat in a "wet combustion" merely by the supply of oxygen or air through line 63. The temperature may first be brought up to 300° to 350° F., either by steam if available, or by usual submerged combustion, with supply of both air and fuel gas—then the reaction becomes sufficiently exothermic to supply heat for the evaporation, and electric power from 69 due to the expansion of the gases in the expander 67. Instead of the indicated piston units 64, 65, and 67, these may be centrifugal units on a common shaft to drive, also on the shaft, the motor-generator.

Submerged combustion may have a major use with the flow sheet of FIGURE 4 for Flash Evaporation-Open Condensation with Chemical Reaction between; and the relation of the supply of air, and of recovery of steam and power may be related to the flow sheet of FIGURES 3 or 5. The Flash Evaporation, as any evaporation, does concentrate the solution, after the chemical reaction, but the net effect is lost in FIGURE 4 because the steam formed goes to dilute further the feed—not a disadvantage in many cases.

If relatively large amounts of steam and gases are produced—particularly when the fuel being combusted is in the dilute solution being fed to the system, the mixture of gases and as much steam as is not needed in the condensing-heating side 11 of the ladder may be withdrawn for use. A cyclone or other type of demister may be necessary to minimize entrainment. This may take the place of the combustion gas cooler 68 in FIGURE 5 or attached to the line 131 in FIGURE 4.

Use of system for recovering heat otherwise rejected with submerged combustion In the operation of the Submerged Combustion Heater of FIGURE 3, and whether operating with an added fluid fuel or with a wet combustion of organic materials in the dilute solution itself, the discharged mixture of combustion gases and steam is at the high temperature and pressure of the heated dilute solution going to the top flasher. There is the usual difference between this temperature and that of the distillate water leaving the top flasher. As noted above, if the dilute solution contains much organic wastes, considerable gas and steam may be generated by a submerged or wet combustion, and these may allow the expander 67 (either with or without the use of the gas cooler 68) to develop a significant amount of electrical energy in the generator 69. When outside fuel is used, this may not be so important.

However, since the gases must be removed, and they necessarily carry with them the corresponding amount of steam, this may be utilized, as indicated above, in preheating the raw sea water coming into the system. More heat is available than necessary for this preheating of the feed, so most of the entering sea water passes through the Heat Exchanger. In any case, this preheating of feed is a relatively uneconomic use of the latent heat of the steam carried with the combustion gases since it is used mainly to add heat at a much lower temperature than that of the Prime Heater.

It has now been found that this mixture of combustion gases and steam can be used to heat the distillate leaving the Vapor Reheat ladder to a temperature above that of the top stage. The distillate will then pass to the Heat Exchanger at a correspondingly higher temperature. If the temperature of approach in the Heat Exchanger of entering sea water to that of the hot distillate is fixed, as it well may be, there, is then obtained a higher temperature of sea water entering the Prime Heater. This reduces correspondingly the heat requirement in the Prime Heater; and thus increases the efficiency (and capacity) of the unit as a whole to give a lower heat cost per unit of distillate produced. FIGURE 3 has a half-stage 19, particularly effective here.

FIGURE 3 diagrams one means of saving heat otherwise rejected when utilizing a submerged combustion prime heater. Here, the heavy dashed line 46 diverts a part of the stream of sea water passing from the heat exchanger 40 to the prime heater 60. The amount diverted so as to by-pass the prime heater 60 is controlled by the valve, and this amount enters a flash stage from two to ten down from the top. This allows the recovery of heat otherwise rejected, as does the line 20 of FIGURES 1 or 2.

While this diagram refers to the flow sheet of FIGURE 3, which is for a vapor reheat multiflash evaporator, the same diagram would be used if the Flash Evaporator side of the ladder was the left or evaporator side of the conventional multiflash system. The process of FIGURE 5, particularly as it refers also to the recovery of heat otherwise rejected, would be used with a conventional multiflash evaporator.

In FIGURE 5, since it has two multiflash evaporation-condensation ladders, there are more ways of operations to recover heat otherwise rejected. Thus, a line 20 shows a diversion around the prime heater of a minor portion of the dilute solution back to a selected stage where the temperature is approximately the same within two to ten stages down from the top. Also, from the same line 44, there may be withdrawn by line 120 a stream which also by-passes the prime heater-reactor and goes back to a stage in the flash evaporator-open condenser where the temperature is about the same, within two to ten stages from the top.

A somewhat related stream is that in line 220 which may pass all, part, or none of the discharge from the bottom of the flash evaporator-open condenser back to a point in the vapor reheat system where the temperatures are about the same.

The operation of these lines for feeding a stream from a temperature approximately equal to that in a position farther along in the processing allows the balancing of heat flows on the two sides of a ladder of stages, as described above. In the operation of an evaporator-cooler after a prime heater-reactor, as in FIGURE 4 or 5, there is an essential additional aspect of control, for example, to prevent a runaway rise of temperature and pressure if too much fuel and oxygen are added due to a sudden increase in combustibles in the feed.

It is desirable to deaerate the dilute aqueous feed by any of the usual systems or simultaneously with the removal of combustion gases from a submerged combustion heater. Some additional provision must also be made on each stage. The vents shown in FIGURE 3 allow the removal of noncondensible gas coming from any source in each stage. Each vent is merely a short, valved pipe of small diameter with ends connected into the vapor spaces of adjacent condensation compartments. The valves and pressure differences allow venting of gas mixed with some vapor from each compartment to that of the next lower pressure. Finally, the vent discharges from the lowest pressure compartment to a vacuum pump, as shown, or to the atmosphere, if the last pressure stage is at or above atmospheric pressure.

FIGURE 3 diagrams and exemplifies one combination of the unitary systems or operations comprising this improved Vapor-Reheat method for desalinating sea water; and it does not indicate all of the features or necessarily the best combination of them, particularly when the requirements of a different situation may be considered. Thus, it does not indicate the recycle or "reflux" of concentrated sea water back to the inlet of raw sea water to take advantage of the higher temperature of the effluent stream and thus economize up to 20% or more of the amount of heat required in the prime heater. (This economy is larger for a smaller number of stages, and for less high temperatures of inlet sea water to the top of the Vapor-Reheat ladder of stages.)

FIGURE 3 shows a system for control of the heat balance of the evaporator to prevent "heat reject" through by-passing a part of the entering sea water around the prime heater to a stage slightly below the top one (usually two to ten from the top), as shown in FIGURE 2. While such loss of heat is not necessary when proper controls are established and maintained for optimum conditions, it might normally represent an average loss of 20% from optimum conditions. This system will reduce it to an average of 2 to 3%. Similarly, the saving of heat otherwise rejected may be used with the multiflash evaporator of the conventional type, with a submerged combustion heater, wherein there is the same relation as shown in FIGURE 3 with regard to the evaporator side of the flash stages, while the condenser side of the respective stages would supply the heated liquid directly to the submerged combustion heater, as through line 44, and a part of this fraction would be taken as in line 46.

Although FIGURE 3 indicates the use of a liquid-liquid-liquid heat exchanger, advantage may be taken instead of the new Method of Cooling Volatile Liquids of copending application Ser. No. 241,721 of Dec. 3, 1962, now U.S. Patent 3,306,346 of Feb. 28, 1967, Method for Cooling Volatile Liquids, particularly if an especially pure water, twice distilled, is desired as the product. This system produces the twice-distilled product at no additional heat charge compared to the usual single-distilled product.

The several features of this invention, as described above, and discussed in relation to the Vapor Reheat system of multiflash evaporation are applicable also to the usual type of multiflash evaporation (except for those concerned with heat exchanging to cool the heated distillate stream). No combined drawings similar to FIGURE 3 are necessary to understanding the analogous flow sheets.

*Chemical reaction in dilute liquors—use of flash evaporation-open condensation*

In chemical reactions in dilute solutions, a substantial amount of heat may be required to heat the dilute solution up to a sufficiently high temperature for the chemical reaction to start, or to continue, often exothermically. The chemical reaction then takes place between the dissolved or suspended materials in the solution, or with one or more added materials—gas, liquid, or solid.

The heat required to bring up to reaction temperature may be a major part of the cost of operation. Particularly is this a large expense if materials of little or no value must be handled on a very large scale, as sewage or sludges from sewage—with or without added garbage containing 75 to 95% or more of water, also peat and other colloidal materials.

Also, constituents in water which form boiler scale, may be removed by precipitation at high temperatures, with or without the addition of small amounts of chemicals. One method is that of copending divisional application of the parent application, Ser. No. 252,473, now Patent No. 3,329,583. The heat required for heating hard waters to the necessary high temperature would be impossibly expensive for this simple operation of "softening" water, unless the heat could be recovered. This is made practical by the vapor reheat system of cooling by flash-evaporation of the hot liquid after the reaction, and direct heating of the dilute feed liquid passing in open, dispersed flow in condensing zones with open condensation of the vapors formed by the flash evaporations.

Another example is the recovery of chemicals from the black liquors from various wood pulping operations: usually containing substantial amounts of sodium, magnesium, calcium, etc., combined with lignin, also as salts: sulfates, sulfites, sulfides, carbonates, bicarbonates, acetates, etc.

Thus, vapors formed in multiple-flash evaporation stages heat directly by counter-current contact the dilute liquor in open, dispersed flow in condensing zones of the stages. Very inexpensive equipment is used. There is no heat transfer surface; and there is no danger of plugging, as with heat interchangers of the normal type. After the dilute liquid has been preheated, it passes to a prime heater and chemical reactor (which may consist of one, two, or more vessels). Chemical materials may be added to accomplish a reaction. One useful reaction is wet combustion, accomplished by added oxygen as such, or as air, possibly with other chemical reactive materials for some other reaction. Particularly at start-up, or if the reaction involved is not sufficiently exothermic, the prime heater-reactor may have added to it additional heat in the form of steam, or from other sources, including submerged combustion of an added fluid fuel.

After the reaction, the hot solution is flash evaporated in a ladder of stages, and the flash vapors are passed to the condensing zones to preheat the dilute feed solution in open and extended counter-current flow, by direct contact and condensation.

In those cases where there are organic oxidizable materials present in the dilute solution being processed, e.g., sewage, sludges therefrom, or waste liquors from pulp and paper manufacture, these oxidizable materials may be combined in the aqueous phase with oxygen added as such, or as air. Usually, it is desirable to macerate or comminute the solids so that they will be in relatively small particles to allow adequate opportunity for the wet combustion. Such a wet combustion destroys the organics which may not be discharged safely as sewage wastes directly into rivers or other bodies of water because of their biological-oxygen-demand (BOD), i.e., the oxygen which will be used by micro-organisms in biological degradation of the organics. Thus, the wet combustion fulfills also much of the chemical-oxygen-demand (COD) as measured by the ability of these organic materials to be oxidized chemically.

Much heat may be developed in this process, depending upon the concentration of the organic materials present and their COD. Another important factor is the nature of the organic materials; since it has been found that some types of organic material are very much more resistant to oxidation than are others. Thus, it may be almost impossible to reduce the COD to zero, even by extended time and at temperatures above 600° F. Different materials are found to be combusted at different temperatures, and even extending a treatment at a given temperature for a long period of time does not further reduce substantially the COD of the remaining material.

As is common in most chemical reactions, an increase of temperature accelerates greatly the speed of the combustion in the presence of oxygen or air supplied from the outside. However, there must be a definite amount of holding time in this prime heater or reactor, varying from one minute to several or more hours, depending on the particular operation involved. Thus, the prime heater-reactor should have substantial volume for the operation in question to allow the requisite residence time, preferably between from one minute to 200 minutes.

It may be desirable after the heating and reaction in the prime heater-reactor to filter or separate solids, or otherwise to process the liquid before it is passed to the first or highest pressure stage of flash evaporation. Filtration at the relatively high temperatures and pressures is difficult and is usually not necessary, since the flash evaporation does not allow opportunity for fouling by the solids present, which may then be removed after the multiple flash evaporation.

Following the wet combustion and the residence time in the prime heater-reactor to allow completion of the reaction, the liquid is flash evaporated in each of a series of stages, thereby becoming more concentrated as it passes from a top stage of highest pressure to the stage of lowest pressure. Vapors pass to the corresponding condensing zones, wherein the cold feed liquid is preheated.

The type of organic materials in the dilute solution—present as liquid or solid, dissolved or suspended—determines the top temperature for preheating by open condensation of the flash vapors. This is at least 300 to 350° F. but may be 400° F. or even higher. A temperature must be reached where adding oxygen gives an exothermic reaction, and depends on the nature and amount of the combustibles present in the dilute solution processed.

FIGURE 5 is a flow sheet of one operating process combining several of the steps. It does not show a half-stage which, if used, utilizes vapors from the prime heater-reactor for bringing the dilute solution up to the desired temperature. The half-stage could be used as indicated in FIGURE 3. The liquid stream is pre-heated to the necessary temperature for wet combustion as it leaves the top stage or the half-stage—as the case may be. Oxygen or air is added in pipe 133 and/or through line 63 directly to the reactor, which is of a sufficient size to allow a residence time of liquid from 1 to 200 minutes. Usually excess air is added to obtain maximum combustion. With colloidal solutions of peat, only sufficient combustion to break the colloid may be desired, air flow is regulated accordingly, and most of the peat is later separated as granular solids from water discharging in 132. Alternately, the peat may be completely burned to give its full heating value, with substantial generation of steam.

Heat from the wet combustion raises immediately the temperature of the liquid in the prime heater-reactor to 500–700° F. The total pressure is from 500 to 3000 pounds per square inch, including (a) saturation pressure of the water, (b) partial pressures of organic vapors, (c) components of air—principally oxygen and nitrogen, and (d) products of combustion-carbon dioxide and carbon monoxide. Air is supplied at this high pressure, as is also the liquid, and the design pressures for the pumps (not shown) supplying liquid to the half-stage, if used, and to the prime heater-reactor, must be correspondingly higher than those in the vapor reheat ladder of stages.

This strongly exothermic wet combustion burns organic materials at a much lower temperature than that of dry combustion in the usual furnace. However, the steam which is generated and available at the correspondingly high pressure is generated in the same zone as the combustion itself, rather than in a removed zone, as in the case of the ordinary boiler tube with a gaseous combustion outside the metal wall.

The substantial amount of gases from the combustion may be separated readily from the top of the prime heater-reactor along with some steam. A cyclone may aid this separation. These permanent gases with a considerable amount of steam may pass off to an expander, either turbine or other form of expansion engine, which can utilize best the mixture of steam and the combustion gases, largely carbon dioxide and nitrogen, together with certain volatiles. If the liquid is drawn from the bottom of the prime heater-reactor to a second vessel, the liquid will be largely free of non-condensibles.

The liquid may be allowed to flash evaporate at a slightly lower pressure in this second vessel, to give steam directly usable for other process purposes, e.g., for use in an evaporation. This then is supplied, for example, to line 31 of either FIGURE 4 or FIGURE 5, to heat the half-stage, if such is used; and other streams of steam at this relatively high pressure may be withdrawn through line 231 for other process uses outside of this system. The hot liquid then may be passed, either directly or after going through a filtering device or other additional chemical treatment, into the top stage of the flash evaporator-cooler, the left side 10 of the ladder of FIGURE 5, in the familar form. While not shown, a conventional multiflash unit with vapors condensing on tubes for preheating the feed may be used in the general arrangement of FIGURE 1.

Organic compounds often combust to intermediate compounds before going to the ultimate carbon dioxide; and these intermediates are harder to oxidize further. One of the last of the organic compounds to be oxidized is acetic acid. This molecule has as many atoms of oxygen as of carbon, two of each, and oxidizes in this wet combustion only at a temperature above 430° F.

If the acetic acid is not completely combusted, it may be desirable to inject into line 133 or into the stream passing to the flash evaporator supplying process steam, or to the top stage of the evaporator side 10, aqueous caustic soda or other alkali. This will neutralize volatile acids, most of which is acetic acid, which otherwise may cause corrosion. Particularly it is desirable to prevent volatile acids flash evaporating and condensing into the fresh water product, if such is made in a subsequent vapor reheat ladder, as in FIGURE 5.

By injecting an alkali, as caustic soda or lime, into the feed at 14, or into the preheated feed at 127, the wet combustion will produce sodium acetate or similar salts as the oxidation of the organic matter proceeds. This salt or salts may be further degraded or may remain and discharge to the flash evaporation side 11 of the vapor reheat ladder, thence out line 32, for separation from the water. Various solids in the discharge may be decanted.

Similarly, aqueous sulfuric acid or other non-volatile acid may be added at line 133 or line 233 to neutralize amines or other volatile alkaline materials which may be present; but preferably not in sufficient amount to release acetic acid from its salts.

Particularly useful is this process in handling black liquors from wood pulping for paper production. These liquors contain inorganics which may be reused after the dry combustion, as is standard practice after concentrating black liquors. In this wet combustion of the lignins and other organics present in these black liquors, sodium or other metals or metalloids which are present as salts, react with the carbon dioxide under the high pressure and intense activity, to give salts, which then will be in a form which can be made available for reuse in preparing pulping liquors.

Again, the method of controlling or balancing the operation of the flash evaporation-cooling side 10 of the ladder to balance that of the open condensation-cooling side 11 of the ladder, may be by rejecting heat, exactly as before, from a lower stage. The saving of heat otherwise rejected when the preheating is done in closed flow may be accomplished exactly as in FIGURE 1, if 12 is considered not only as a prime heater, but also as a chemical reactor.

Heat losses are minimized by withdrawing a minor part of the liquid being heated in open flow, after being heated in the condensing zone of from two to ten stages from the bottom, or low temperature end. This minor part may be discharged to either zone of a lower stage—from two to ten below. If discharged to a flash zone, line 8—or one external to the evaporator body is used; if as is preferable, to an open condensing zone, line 38 is used.

A preferred system of recovering heat otherwise rejected is to withdraw a small fraction of the stream after being heated in the top stage of highest temperature or in the half-stage. This is by-passed around the prime heater, directly to a flash evaporating stage, which is two to ten below the top. This allows immediate control of the reaction, in the case of an upset due to a change in the amount of combustibles in the feed. The by-passing of a few percent of the feed around the prime heater-reactor is not usually of moment, even in wet combustion of sewage organics, since the overall operation usually performs at a higher than necessary elimination of combustibles and hence of COD. Recovery of heat otherwise rejected is of major advantage where a chemical reaction at a high temperature in a dilute solution is followed by a multiple flash evaporation giving vapors to preheat by vapor reheat open-condensation the dilute solution feed in dispersed flow. It is equally useful where closed condensation on tubes preheats the dilute feed.

One example is wet combustion of peat. Peat for ordinary combustion is usually dried in the open air to remove the 80 to 95% colloidal moisture present. When impractical to dry, a slurry in water may be partially wet combusted to break the colloid. Separation is easy of peat particles from water discharging from 132. Complete wet combustion gives the full heating value. In either case, the control of the reaction by by-passing a small stream around the prime heater is very fast, with a minimum of heat loss.

In chemical reaction processes utilizing vapor reheat with recovery of heat otherwise rejected, impurities are eliminated to purify water. Water also may be recovered, distilled or twice-distilled.

*Hybrid evaporator*

FIGURE 6 diagrams a so-called Hybrid Evaporator, which may utilize the methods of preventing heat reject while combining some of the advantages of a multi-*effect* evaporator with those of a conventional multi-*flash* evaporator, including the vapor reheat evaporator. In this combined unit, each stage of the multiflash system operates, as usual, by flash evaporation on the left or evaporator side 10 of a succession of stages. Vapors from the flash evaporation are condensed on the right or condensing side 11, on tubes preheating the feed or in the familiar circulating stream of fresh water of the vapor reheat system, always at a lower temperature than the liquid which is flash evaporating.

In addition to this flash evaporation and either closed or open condensation of vapors, there is withdrawn through the curved vapor lines 3 of FIGURE 6, vapors which are fed to a heat transfer surface, or coil, of any desired type located on a lower stage, which transfers heat as in any ordinary evaporator, by condensing the steam on one side of a metallic surface with the boiling liquid on the other. The temperature of the steam rising from the flash evaporation in any one stage, is obviously higher than the liquid on the next lower stage; and there is thus the necessary temperature drop to give the heat flow to cause evaporation, as is usual in an evaporator with heat transfer surface. FIGURE 6 diagrams 5 stages; and with the half-stage this gives a total of 6 condensing zones, with direct contact with fresh water being circulated in each, to condense the respective vapors formed. The closed condensation of the conventional multiflash system is not shown; but it would be the same as the right side 11, of FIGURE 1.

The operation of FIGURE 6 is exactly that of a vapor reheat evaporator, as previously described, with a multiple-effect evaporator of the same number of stages superimposed thereon. There is a combination of the steam flows, also of the condensate flows, as in a vapor reheat unit. In this Hybrid Evaporator, the operation of each of the separate components is improved over what it would be alone. The multieffect evaporator component operates in a forward feed manner, and it has the advantages only otherwise achieved with a large number of heat exchangers. Thus, it achieves an efficiency equivalent to a multieffect, with a line of heat exchangers for preheating the feed, and another line for recovering the heat in the condensate due to this super-imposition of it upon the vapor reheat ladder. It represents a much more economic evaporator for its service than the usual multiple-effect evaporator taken by itself. Similarly, the vapor reheat ladder may be operated at its greatest efficiency, which is where there is no recycle or reflux of concentrated solution back to join the feed liquor. This eliminates the high elevation of boiling point which must be overcome in the top stage, when there is large reflux. It is always necessary to supply the temperature difference equal to this boiling point elevation, plus the other temperature differences which are involved, by heating in the prime evaporator. If the elevation of boiling point is minimized by having the lowest concentrated feed, that of the dilute solution, without reflux, this is an important heat economy. Therefore, the vapor reheat aspect in the hybrid evaporator is also simpler, since it does not require the recycle or reflux; and more efficient in that the boiling elevation at the top of the ladder is minimized.

For these reasons, the Hybrid Evaporator has been found to give advantages to each of the systems over their individual operations.

While the heat transfer surfaces, 5, are indicated diagrammatically as ordinary submerged heating coils, it is recognized that this is not the most efficient type of heat transfer surface for an evaporator. Hence, the design of the heat transfer surface may be any one of the many types of natural or forced circulation, falling film, or other types of surface familiar in evaporator design, and such types may be incorporated in place of the coil, 5, which is indicated here by any suitable mechanical design. One preferred type might be a falling film evaporator, with a long tube, to obtain the high heat transfer coefficients obtained with this type of evaporator surface.

A large number of effects, from 12 to 20, would be indicated in any commercial unit for desalination use. However, the number of multiflash stages to show minimum productive costs when the cost of thermal energy and the cost of equipment are balanced, may usually be in the range of 35 to 50.

Thus, it may be quite often that the most economical number of stages for the operation may be a much greater number than the optimum number of effects in the multieffect evaporator with heat transfer surfaces, which is a part of this hybrid unit. Therefore, the number of flash stages may be most economic with 2 or even 3 times the number of effects with heat transfer surface. The design then might allow the vapor line, 9, leading from the top stage with pressure $P'$, to go instead to a coil in the stage of pressure $P'''$, and then the vapors formed at this pressure, $P'''$, may go to the heat transfer surface in a stage $P^v$, or even $P^{vi}$ (not shown). In this way, the temperature differential, say for most economic heat transfer to the coils, 5, may be that of several or more of the differences of temperature realized in flashing from stage to stage.

On the other hand, there may be a compromise, and a somewhat smaller number of flash stages and a somewhat larger number of effects may be used than would ordinarily be utilized respectively, in order to optimize both components of this hybrid evaporator. This then would be balanced out at the same number of effects and stages.

It has been found that the spacing of the multiple effects with regard to the flash stages may not be uniform throughout the whole ladder. For example, there may be more stages per effect in the lower pressure range, to give the usual higher temperature drops associated with the low pressure effects in the usual multieffect. Or the effects may be in only a part of the range of stages; and they often may be found most advantageous in the higher pressure range with only multiflash stages in the lower pressure range. Because the viscosities of solutions increase in the lower pressure range of stages, due to lower temperatures, and particularly increased concentration, particularly for some concentrated solutions, heat transfer through metallic surfaces becomes less efficient. Thus, there may be no effects below some particular pressure; and above this pressure, the heat transfer surfaces of the effects may give the larger part of the evaporation. Indeed, in some efficient designs for particular liquids, there may be little or no flash evaporation in the upper temperature ranges.

It is, of course, possible to take off a greater amount of vaporization in any one stage than would be passed to the condensing side of that stage, and it is therefore possible to withdraw some of those vapors for the heat transfer in the lower stage, through the condensation in closed tubes, as previously noted. This means that vapors may be withdrawn from the prime heater through the line 103, to the closed coil in the top stage $P'$. This temperature drop usually will be substantial. However, it may be desired to remove vapors from $P'$ and bring them to a stage below the next stage, e.g., $P'''$. There may be no condensing coil or "effect" in the stage $P''$, but vapors may be withdrawn from $P''$ to $P''''$, where there may be a heat transfer coil. In that case, the vapors may then be withdrawn from $P''''$ to $P^{vi}$, the stage below $P^v$. Then each effect will actually show the temperature drop of 2 stages. Or, in the system shown, there may be only coils in the stages $P'$, $P'''$, and $P^v$, in which case, the vapor lines 3 would go only from $P'$ to $P'''$, $P^v$ which would have the coils, and $P''$, $P''''$ would merely act as flash stages.

Other combinations of vapor withdrawals from stages to supply the condenstation zone of the same stage and at the same time to supply a heating coil or calendria of a lower stage, are possible.

The evaluation of the optimum relation may be done through knowledge of: (a) the heat transfer coefficients which are to be expected in the particular type of coil or calendria; (b) the overall temperature which is available from the highest temperature which can be reached in the prime evaporator, based on steam pressure limitations; (c) steam costs at different pressures; (d) scaling problems of the water itself at higher temperatures; (e) the number of stages which may be desired; (f) the cost factors of mechanical design; and (g) some other variables.

The advantages of this Hybrid Evaporator, either with conventional multiflash or with vapor reheat, are realized especially well through the system of recovery of heat which otherwise is rejected; since this allows the maintaining of the optimum or near-optimum thermal efficiency of the multiflash ladder, as above explained. With the integration of the multieffect evaporator into the multiflash evaporation ladder—either conventional or vapor reheat ladder in the Hybrid Evaporator, there is an increased complexity of controls; and the possibility of an upset in operation is increased. The heat balance between the two sides of the ladder may be promptly effected with a minimum of heat rejected if the same systems are used as before described, each giving their relative advantages. Thus, in the Hybrid Evaporator, with either vapor reheat or conventional multiflash, a part of the dilute feed may be diverted around the prime heater 12, by valved lines 20 and 22; while in the conventional multiflash, a valved line 8, and in vapor reheat a valved line 38 may serve as before to divert part of the liquid being heated to a lower stage with advantages already explained.

I claim:

1. In the system of heating, flash evaporating, and condensing vapors so formed, of an original aqueous solution, to recover at least part of its water content in a more pure form, the process which comprises the following steps:
   (a) flowing an aqueous stream through a series of water-vapor-condensing zones of increasing temperature in the direction of flow, so as to absorb heat, which heat is used to preheat the said original aqueous solution.
   (b) heating at least a major portion of the said original aqueous solution to the highest temperature it encounters in the system in a prime heater, where heat is supplied at the highest temperature in the system;
   (c) withdrawing an aqueous liquid from the prime heater and passing it directly after said heating into respective flashing zones of the plural stages at successively lower pressures and boiling point temperatures corresponding to the respective pressures, reduced from that at the discharge of the said prime heater, to flash vaporize a part of the water of the aqueous liquid withdrawn from the prime heater, and to obtain water vapors in each of the respective flashing zones of the plural stages;
   (d) directing the said water vapors formed in each of the respective stages to respective water vapor condensing zones of said stages;
   (e) condensing the water vapors formed in the respective flashing zones of the plural stages to supply heat to the said aqueous stream, which at a relatively lower temperature, is flowing through the said series of water-vapor condensing zones;
   (f) withdrawing a minor part of said aqueous stream at a relatively lower temperature after it has passed through at least two to ten water-vapor condensing zones of said stages while being heated in each such zone; and allowing said major portion of said aqueous stream at a relatively lower temperature, to pass through the remainder of the said water-vapor condensing zones while being heated in each such zone; and
   (g) introducing said minor part of said aqueous stream at a relatively lower temperature to one of said plural stages which is from the second to the tenth below the stage at which it is withdrawn, in the order of flow of the aqueous solution withdrawn from the prime heater, so as to vaporize a part of said minor part of said aqueous stream, and to add to the water vapors passed to the condensing zone on that stage.

2. In the system of claim 1, wherein the said aqueous stream which is at a relatively lower temperature as it is being passed through the respective condensing zones of said plural stages, is the original aqueous solution.

3. In the system of claim 2, wherein the said passage through the respective condensing zones is through closed channels, on the surfaces of which the said water vapors in the said plural stages are being condensed to heat the said original aqueous solution which, in each stage, is at a relatively lower temperature than the corresponding water vapors formed in that stage; and said minor part of said original aqueous solution which is withdrawn after having passed through at least two to ten condensing zones is being introduced into the flash evaporating zone of the stage which is the second to the tenth below that at which it is withdrawn in the order of flow of the aqueous liquid withdrawn from the prime heater.

4. In the system of claim 2, wherein the said passage of the original aqueous solution through the respective condensing zones is in open, dispersed flow, so as to allow direct contact and condensation thereon of the water vapors formed in the respective plural stages, and to make a combined stream of condensate so formed with the original aqueous solution.

5. In the system of claim 1, wherein the said aqueous stream which is at a relatively lower temperature as it is being passed through the respective condensing zones of said plural stages, is a stream of fresh water being maintained at temperatures below its boiling points at the pressures prevailing in the respective condensing zones;
   said stream of fresh water being directly contacted with the said water vapors formed in the respective plural stages to condense the water vapors and to form a combined stream of fresh water therewith;
   said combined stream of fresh water leaving the said condensing zone at the highest temperature and pressure of said plural stages being passed to a countercurrent liquid heat interchanging operation with the said original stream of aqueous solution which is heated thereby, while said combined stream of fresh water is cooled thereby; and
   said minor part of said fresh water stream which is withdrawn after having passed through at least two to ten condensing zones being introduced into the same fresh water stream in the condensing zone of the second to the tenth stage below that at which it is withdrawn, in the order of flow of the aqueous liquid withdrawn from the prime heater.

6. In the system of heating, flash evaporating, and condensing vapors so formed, of an orginal aqueous solution, to recover at least part of its water content in a more pure form, the process which comprises the following steps:
   (a) flowing an aqueous stream through a series of water-vapor-condensing zones of increasing temperature in the direction of flow, so as to absorb heat, which heat is used to preheat the said original aqueous solution;
   (b) dividing the said original aqueous solution after being preheated into a major portion and a minor portion;
   (c) heating the said major portion to the highest temperature it encounters in the system in a prime heater, where heat is supplied at the highest temperature in the system;
   (d) withdrawing an aqueous liquid from the prime heater and passing it directly after said heating into respective flashing zones of plural stages at successively lower pressures and boiling point temperatures corresponding to the respective pressures, reduced from that at the discharge of the said prime heater, to flash vaporize a part of the water of the aqueous liquid withdrawn from the prime heater, and to obtain fresh water vapors in each of the respective flashing zones of the plural stages;
   (e) diverting said minor portion of said original aqueous solution around said prime heater, so that it rejoins the aqueous liquid withdrawn from the prime heater at that one of the said plural stages which is from the second to the tenth from the top in the order of flow of said aqueous liquid from the prime heater below the top stage;
   (f) directing the fresh water vapors formed in each of the respective stages to respective water-vapor condensing zones of said stages;

(g) condensing the water vapors formed in the respective flashing zones of the plural stages to supply heat to the said aqueous stream, which at a relatively lower temperature, is flowing through the said series of water-vapor condensing zones.

7. In the system of claim 6, wherein the said aqueous stream which is at a relatively lower temperature as it is being passed through the respective condensing zones of said plural stages, is the original aqueous solution.

8. In the system of claim 7, wherein the said passage through the respective condensing zones is through closed channels, on the surfaces of which the said water vapors in the said plural stages are being condensed to heat the said original aqueous solution which, in each stage, is at a relatively lower temperature than the corresponding water vapors formed in that stage; and said minor part of said original aqueous solution which is diverted around the prime heater is being introduced into the aqueous liquid withdrawn from the prime heater in the flash evaporation stage which is from the second to the tenth below the top stage in the order of its flow.

9. In the system of claim 7, wherein the said passage of the original aqueous solution through the respective condensing zones is in open, dispersed flow, so as to allow direct contact and condensation thereon of the water vapors formed in the respective plural stages, and to make a combined flow of condensate so formed with the original aqueous solution.

10. In the system of claim 6, wherein the said aqueous stream which is at a relatively lower temperature as it is being passed through the respective condensing zones of said plural stages, is a stream of fresh water being maintained at temperatures below its boiling points at the pressures prevailing in the respective condensing zones; said stream of fresh water being directly contacted with the said water vapors formed in the respective plural stages to condense the water vapors and to form a combined stream of fresh water therewith;

said combined stream of fresh water leaving the said condensing zone at the highest temperature and pressure of said plural stages being passed to a counter-current liquid heat interchanging operation with the said original stream of aqueous solution which is heated thereby, while said combined stream of fresh water is cooled thereby; and said minor part of said original aqueous solution which is diverted around the prime heater is being introduced into the aqueous liquid withdrawn from the prime heater in the flash evaporation stage which is from the second to the tenth below the top stage in the order of its flow.

11. In the system of claim 1, wherein some part of the said original aqueous solution is evaporated in the prime heater to give fresh water vapors, the heat for said evaporation being supplied at the highest temperature in the system; and the said water vapors formed in said prime heater are condensed in a condensing zone at a higher temperature and pressure than that of any condensing zone of any of the said plural stages, while heating the said aqueous stream at a relatively lower temperature.

12. In the system of claim 6, wherein some part of the said original aqueous solution is evaporated in the prime heater to give fresh water vapors, the heat for said evaporation being supplied at the highest temperature in the system; and the said fresh water vapors formed in said prime heater are condensed in a condensing zone at a higher temperature and pressure than that of any condensing zone of any of the said plural stages, while heating the said aqueous stream at a relatively lower temperature.

13. In the system of claim 10, wherein the said counter-current liquid heat exchanging operation comprises the following steps:

(a) removing the said combined stream of fresh water heated by the said water vapors from the said condensing zone at the highest temperature and pressure;

(b) cooling said combined stream of fresh water by a series of flash evaporations in a second series of plural stages at successively lower pressures and temperatures; reduced from that at the discharge of the said condensing zone at the highest temperature and pressure;

(c) vaporizing a part of the said combined stream of fresh water and obtaining water vapor in the respective plural stages of the second series of flash evaporations;

(d) directing the said water vapor formed in each of the respective stages of the second series of flash evaporations to the respective condensing zone of said stage, so that it may be condensed and caused to heat without direct contact with the said cooler original aqueous solution which is being circulated in closed channels through said second series of condensing zones; and (e) withdrawing the condensate so formed in the plural stages of the second series of flash evaporations as twice-distilled water.

14. In the system of claim 10, wherein the said counter-current liquid heat exchanging operation comprises the following steps:

(a) removing the said combined stream of fresh water heated by the said water vapors from the said condensing zone at the highest temperature and pressure;

(b) cooling said combined stream of fresh water by contacting it directly in a counter-current, liquid-liquid, relation with an intermediate cooler stream of a substantially water-insoluble liquid, which is being heated thereby; and (c) cooling said stream of substantially water-insoluble liquid, after being so heated, by contacting it directly in a counter-current, liquid-liquid, relation with the said original aqueous solution, thereby heating said original aqueous solution.

15. In the system of claim 1, wherein the external heat supplies to the prime heater for heating the said original solution comes from the burning of an organic material under the surface of the original solution, with oxygen supplied from an external source.

16. In the system of claim 6, wherein the external heat supplied to the prime heater for heating the said original solution comes from the burning of an organic material under the surface of the original solution, with oxygen supplied from an external source.

17. In the system of claim 10, wherein the external heat supplied to the prime heater for heating the said original solution comes from the burning of an organic material under the surface of the original solution, with oxygen supplied from an external source.

18. In the system of claim 1, wherein a chemical reaction is accomplished in the prime heater with some constituent of the said original aqueous solution at substantially the highest temperature of the said original aqueous solution in the system.

19. In the system of claim 9, wherein a chemical reaction is accomplished in the prime heater with some constituent of the said original aqueous solution at substantially the highest temperature of the said original aqueous solution in the system.

20. In the system of claim 18, wherein the said chemical reaction is the wet combustion of oxidizable organic matter contained in the said original aqueous solution by means of added oxygen.

21. In the system of claim 19, wherein the said chemical reaction is the wet combustion of oxidizable organic matter contained in the said original aqueous solution by means of added oxygen.

22. In the system of claim 1, wherein some part of the said original aqueous solution is evaporated in the prime heater to give fresh water vapors; and the said fresh water vapors are withdrawn from the prime heater and condensed in a closed condensing element in contact with the said aqueous liquid withdrawn from the prime heater where it is being flash evaporated on one of the plural stages; whereby the heat given up by the said condensation of said water vapors withdrawn from the prime heater is transferred to the said aqueous liquid being flash evaporated to cause additional evaporation and to add additional vapors to those formed by the flash evaporation and going to the respective condensing zone of that one of the plural stages.

23. In the system of claim 10, wherein some part of the said original aqueous solution is evaporated in the prime heater to give fresh water vapors; and the said fresh water vapors are withdrawn from the prime heater and condensed in a closed condensing element in contact with the said aqueous liquid withdrawn from the prime heater where it is being flash evaporated on one of the plural stages; whereby the heat given up by the said condensation of the said water vapors withdrawn from the prime heater is transferred to the said aqueous liquid being flash evaporated to cause additional evaporation and to add additional vapors to those formed by the flash evaporation and going to the respective condensing zone of that one of the plural stages.

24. In the system of claim 1, wherein some part of the said water vapors obtained by vaporization of part of the water of the aqueous liquid withdrawn from the prime heater, is withdrawn from at least one of the said plural stages;

and said part of said water vapors is condensed in a closed condensing element in contact with the said aqueous liquid withdrawn from the prime heater where it is being flash evaporated on another one of the said plural stages at a lower pressure than that from which the said vapors are withdrawn; whereby the heat given up in the condensation of the said part of said water vapors is transferred to the said aqueous liquid being flash evaporated; so that additional evaporation is caused, and additional vapors are formed which combine with those of the flash evaporation to pass to the respective condensing zone of that one of the said plural stages at a lower pressure.

25. In the system of claim 10, wherein some part of the said water vapors obtained by vaporization of part of the water of the aqueous liquid withdrawn from the prime heater, is withdrawn from at least one of the said plural stages;

and said part of said water vapors is condensed in a closed condensing element in contact with the said aqueous liquid withdrawn from the prime heater where it is being flash evaporated on another one of the said plural stages at a lower pressure than that from which the said vapors are withdrawn; whereby the heat given up in the condensation of the said part of said water vapors is transferred to the said aqueous liquid being flash evaporated; so that additional evaporation is caused, and additional vapors are formed which combine with those of the flash evaporation to pass to the respective condensing zone of that one of the said plural stages at a lower pressure.

References Cited

UNITED STATES PATENTS

| | | | |
|---|---|---|---|
| 2,514,944 | 7/1950 | Ferris et al. | 202—236 |
| 3,152,053 | 10/1964 | Lynam | 159—2 X |
| 3,161,558 | 12/1964 | Pavelic et al. | 203—88 X |
| 3,165,452 | 1/1965 | Williams | 203—11 |
| 3,214,348 | 10/1965 | Lichtenstein | 203—10 |
| 3,329,583 | 7/1967 | Othmer | 202—173 X |
| 3,298,932 | 1/1967 | Bauer | 203—11 |
| 3,288,686 | 11/1966 | Othmer | 203—11 |

NORMAN YUDKOFF, *Primary Examiner.*

F. E. DRUMMOND, *Assistant Examiner.*

U.S. Cl. X.R.

159—16; 202—173, 177, 205; 203—88